(12) United States Patent
Vaidya et al.

(10) Patent No.: US 11,933,228 B2
(45) Date of Patent: Mar. 19, 2024

(54) GEARBOX ASSEMBLY

(71) Applicant: General Electric Company, Schenectady, NY (US)

(72) Inventors: Kedar S. Vaidya, Albany, NY (US); Ahmet Dindar, Albany, NY (US); Bugra H. Ertas, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/812,234

(22) Filed: Jul. 13, 2022

(65) Prior Publication Data
US 2024/0018910 A1 Jan. 18, 2024

(51) Int. Cl.
*F02C 7/36* (2006.01)
*F16H 1/28* (2006.01)
*F16H 57/08* (2006.01)

(52) U.S. Cl.
CPC .............. *F02C 7/36* (2013.01); *F16H 1/28* (2013.01); *F16H 57/08* (2013.01); *F05D 2260/40311* (2013.01)

(58) Field of Classification Search
CPC .............. F02C 7/36; F16H 1/28; F16H 5/08
See application file for complete search history.

(56) References Cited

U.S. PATENT DOCUMENTS

| 2,751,264 | A  | 6/1956  | Wood          |
|-----------|----|---------|---------------|
| 3,884,096 | A  | 5/1975  | Gleasman      |
| 6,159,348 | A  | 12/2000 | Barnsby et al.|
| 8,574,118 | B2 | 11/2013 | McCune        |
| 8,894,529 | B2 | 11/2014 | McCune        |
| 10,240,671| B2 | 3/2019  | Muldoon       |

FOREIGN PATENT DOCUMENTS

| EP | 0743472 A2 | 11/1996 |
| EP | 2901030 B1 | 11/2016 |
| FR | 3127024 A1 | 3/2023 |
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |

*Primary Examiner* — Justin D Seabe
*Assistant Examiner* — John S Hunter, Jr.
(74) *Attorney, Agent, or Firm* — Venable LLP; Peter T. Hrubiec; Michele V. Frank

(57) ABSTRACT

A gearbox assembly for a turbine engine including a drive shaft and a fan shaft. The gearbox assembly includes a first gear, a second gear, and a planet pin. The first gear is coupled to the drive shaft. The second gear is supported by a planet carrier. The planet carrier is coupled to the fan shaft. Torque is transferred from the drive shaft to the fan shaft through the gearbox assembly. The planet pin is disposed within the second gear. A planet pin shape of the planet pin includes a contoured portion that is characterized by a contoured portion deflection that is greater than or equal to −4.2e-03 inches and less than or equal to −1.2e-05 inches.

20 Claims, 12 Drawing Sheets

GEARBOX ASSEMBLY

TECHNICAL FIELD

The present disclosure relates generally to gearbox assemblies for turbine engines.

BACKGROUND

A turbine engine generally includes a fan and a core section arranged in flow communication with one another. A gearbox assembly is coupled between the fan and the core section.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
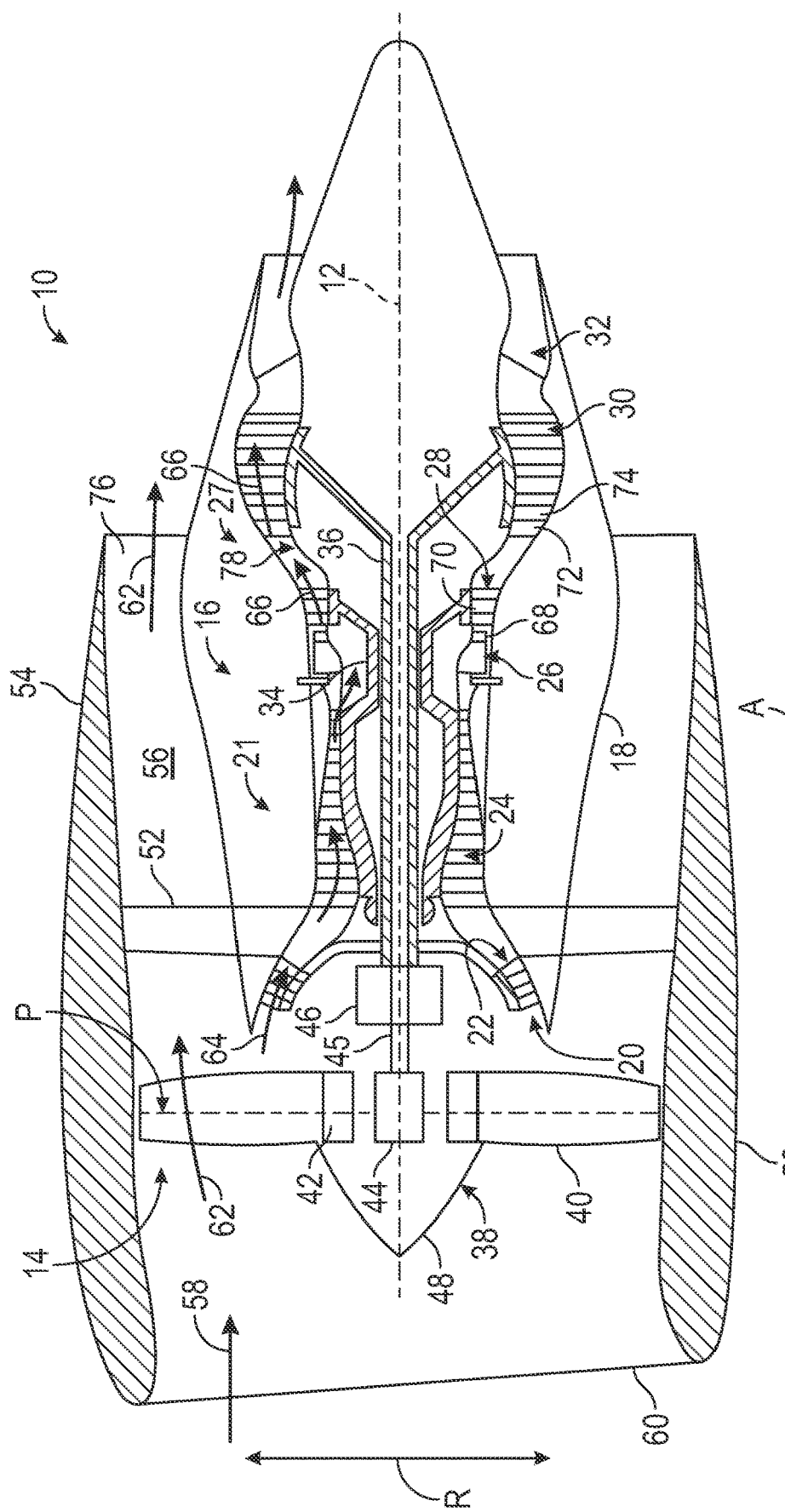
FIG. 1 is a schematic cross-sectional diagram of a turbine engine, taken along a centerline axis of the turbine engine, according to an embodiment of the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" refers to a direction and an orientation that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

A turbine engine can be configured as a geared engine. Geared engines include a power gearbox utilized to transfer power and torque from a turbine shaft to a main fan. Such gearboxes may include an epicyclic gear assembly that includes a sun gear, a plurality of planet gears, and a ring gear. The sun gear meshes with the plurality of planet gears and the plurality of planet gears mesh with the ring gear. In operation, the gearbox transfers the torque transmitted from the turbine shaft operating at a first speed to a fan shaft rotating at a second, lower speed. For a planetary configuration of the gearbox, the sun gear may be coupled to the mid-shaft of a lower pressure turbine rotating at the first speed. The planet gears, intermeshed with the sun gear, then transfer this torque to the fan shaft through a planet carrier. In a star configuration, a ring gear is coupled to the fan shaft. In either configuration, the planet gears rotate about a planet pin in which a journal bearing is formed between the planet pin and the planet gears. The planet pin is disposed within a respective planet gear and includes a clearance between the planet pin and a rim of the planet gear such that lubricant is supplied between the planet pin and the planet gear. The clearance must be maintained during operation of the power gearbox to ensure proper performance of the journal bearing. In some instances, the planet gear may deform due to forces on the planet gear during operation of the power gearbox. Such a deformation of the planet gear may lead to the clearance being decreased and performance of the journal bearing being reduced. As a result, the planet gear is subject to wear and decreased load capacity. Thus, the efficiency (e.g., the ratio of output power to input power) of the power gearbox is reduced.

As engines increase in power and thrust, the torques described become more challenging to accommodate while assuring a sufficient clearance between the journal pin and the planet gear. The inventors, having a need to improve upon the existing planet pins for power gearboxes, designed several different configurations of the planet pins to arrive at an improved design, better suited to handle the torques on the planet pin for different architectures, thereby improving efficiency and power output of a power gearbox.

Referring now to the drawings, FIG. 1 is a schematic cross-sectional diagram of a turbine engine 10, taken along a centerline axis of the turbine engine 10, according to an embodiment of the present disclosure. As shown in FIG. 1, the turbine engine 10 defines an axial direction A (extending parallel to a longitudinal centerline 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor in unison. A low pressure (LP) shaft 36 drivingly connects the LP turbine 30 to the LP compressor 22 to rotate the LP turbine 30 and the LP compressor 22 in unison. The compressor section, the combustion section 26, the turbine section, and the jet exhaust nozzle section 32 together define a core air flowpath.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline 12 via a fan shaft 45 that is powered by the LP shaft 36 across a power gearbox 46, also referred to as a gearbox assembly 46. The gearbox assembly 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased as the second portion of air 64 is routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate. This, thereby, supports operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, and/or turboshaft engines.

Figure 2:
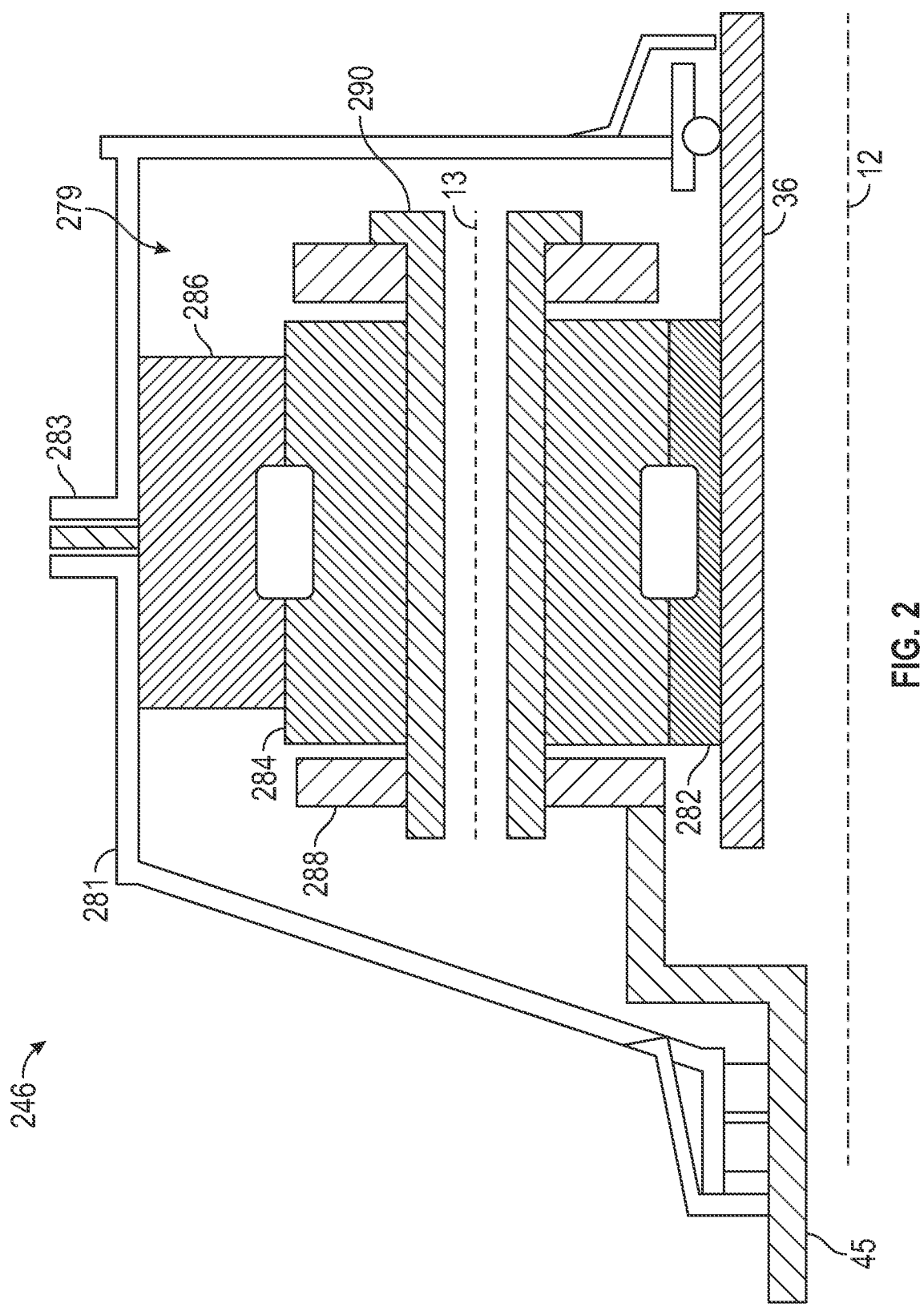
FIG. 2 is a schematic, cross-sectional side view of a gearbox assembly for a turbine engine, according to an embodiment of the present disclosure.

FIG. 2 is a schematic, side cross-sectional view of a gearbox assembly 246, according to an embodiment of the present disclosure. The gearbox assembly 246 may be employed in the turbine engine 10 of FIG. 1. That is, the gearbox assembly 246 couples the LP shaft 36 to the fan 38 (FIG. 1).

The gearbox assembly 246 includes an epicyclic gear assembly 279 that includes a sun gear 282, a plurality of planet gears 284 (only one of which is visible in FIG. 2), and a ring gear 286. A housing 281 encloses the gearbox assembly 246. For clarity, only a portion of the gears is shown and the sun gear 282 and the ring gear 286 encircle the LP shaft 36. Although not depicted in FIG. 2, each of the sun gear 282, the plurality of planet gears 284, and the ring gear 286 comprises teeth about their periphery to intermesh with the other gears. The gearbox assembly 246 is a planetary type gearbox, in that a planet carrier 288 that constrains the planet gears 284 is coupled to an output shaft (e.g., the fan shaft 45), with the ring gear 286 being fixed. In this way, the fan shaft 45 is an output of the gearbox assembly 246, and the fan 38 is driven by an output gear (e.g., the planet gears 284). However, other suitable types of gearbox assemblies may be employed. In one non-limiting example, the gearbox assembly 246 may be a star type or a rotating ring gear type gearbox assembly (e.g., the ring gear 286 is rotating and the planet carrier 288 is fixed and stationary). In such an arrangement, the fan 38 is coupled to, and driven by, the ring gear 286. In this way, the ring gear 286 is an output gear of the gearbox assembly 246. In another non-limiting example, the gearbox assembly 246 may be a differential gearbox in which the ring gear 286 and the planet carrier 288 are both allowed to rotate.

A drive shaft (e.g., the LP shaft 36) is coupled to the sun gear 282. The LP turbine 30 (FIG. 1) drives the LP shaft 36, which is coupled to the sun gear 282 of the gearbox assembly 246. In this way, the LP shaft 36 is an input of the gearbox assembly 246. In some examples, the drive shaft could be a shaft other than the LP shaft 36. Radially outward of the sun gear 282, and intermeshing therewith, is the plurality of planet gears 284 that are coupled together and supported by the planet carrier 288. The planet carrier 288 supports and constrains the plurality of planet gears 284 to rotate around the sun gear 282 in synchronicity while enabling each planet gear of the plurality of planet gears 284 to rotate about its own axis 13. The planet carrier 288 is coupled to the fan 38 (FIG. 1) via the fan shaft 45 and rotates with the plurality of planet gears 284 in order to drive rotation of the fan 38 (FIG. 1) about the longitudinal centerline 12. Radially outwardly of the plurality of planet gears 284, and intermeshing therewith, is the ring gear 286, which is an annular ring gear. In the example of FIG. 2, the ring gear 286 is stationary and fixed via one or more linkages 283 to a stationary support structure of the turbine engine 10.

Each of the planet gears 284 of the plurality of planet gears 284 includes a planet pin 290 about which a respective planet gear 284 rotates. The planet pin 290 provides a journal bearing that allows a respective planet gear 284 to rotate about the planet pin 290. For example, lubricant (e.g., oil) is provided between the planet pin 290 and a respective planet gear 284 such that the planet gear 284 rotates with respect to the planet pin 290. The gearbox assembly 246 includes a gear ratio (GR) that defines a ratio of the speed of the input gear (e.g., the sun gear 282) to the speed of the output (e.g., the planet carrier 288) through the gearbox assembly 246. In other words, the gear ratio is the number of rotations of the input gear for every rotation of the output gear. In the star type configuration, the output is coupled to the ring gear 286.

Figure 3:
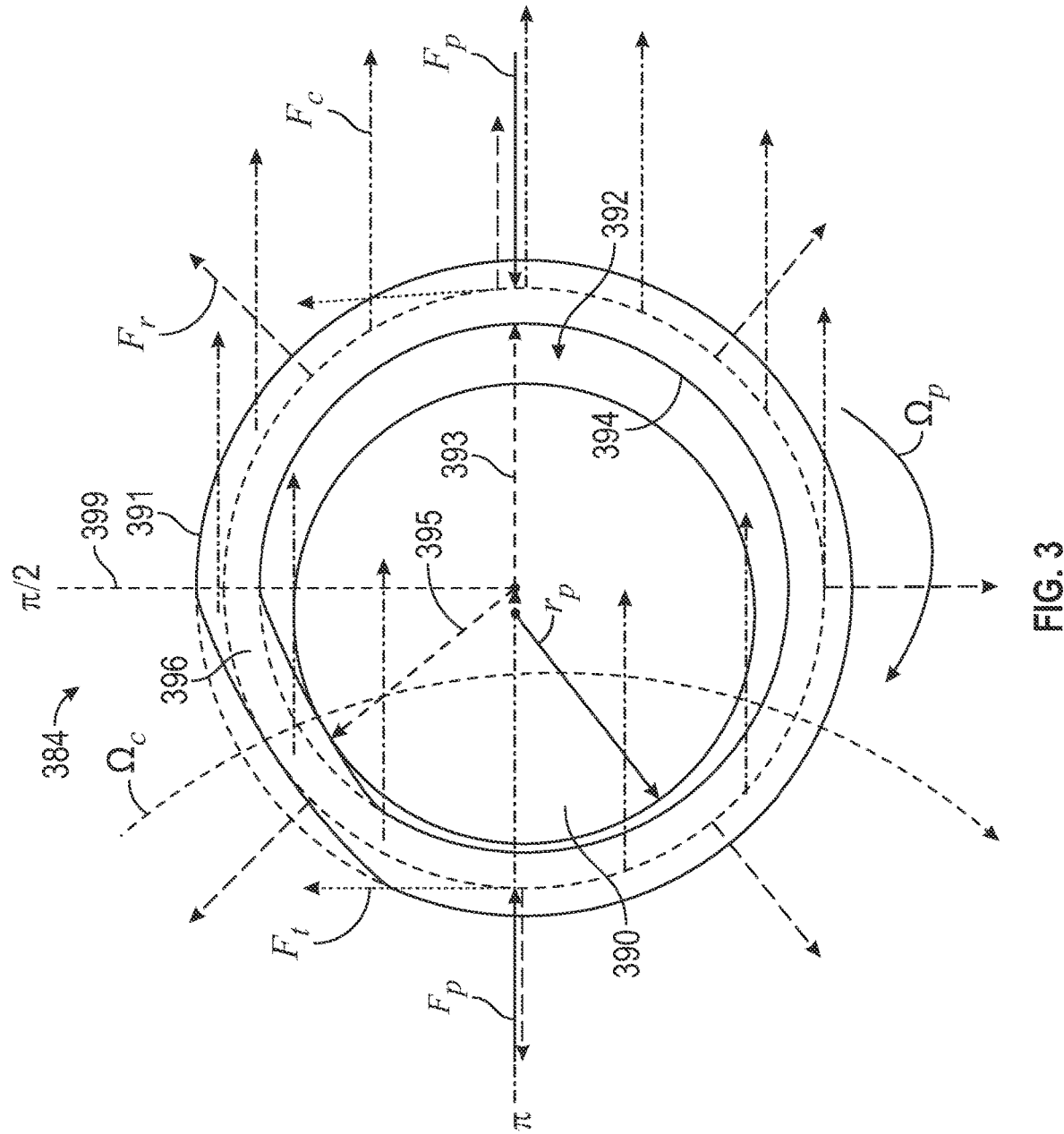
FIG. 3 is a schematic, side view of a portion of the gearbox assembly of FIG. 2, according to an embodiment of the present disclosure.

FIG. 3 is a schematic, front view of a planet gear 384 and a planet pin 390, according to an embodiment of the present disclosure. The planet gear 384 and the planet pin 390 may be used in the gearbox assembly 246 of FIG. 2. The planet gear 384 includes a planet gear rim 391 and a bore that defines an interior 392 of the planet gear 384. The planet gear rim 391 includes an inner radius 393 defined to an inner surface 394 of the planet gear 384. The planet pin 390 is disposed within the interior 392 of the planet gear 384. The planet pin 390 is generally circular and includes a planet pin radius $r_p$. The planet carrier 288 (FIG. 2) is coupled to the planet pin 290. Lubricant is supplied to the interior 392 of the planet gear 384 and the lubricant is disposed circumferentially about the planet pin 390 such that planet gear rim 391 circumscribes the lubricant.

In operation, the drive shaft (e.g., LP shaft 36) rotates, as detailed above, and applies a torque to the sun gear 282 (FIG. 2). The sun gear 282, in turn, rotates and applies a torque to the planet gear 384. The planet gear 384 rotates about the planet pin 390. The planet gear 384, in turn, rotates and applies a torque to the planet carrier 288 (FIG. 2). The planet carrier 288, in turn, rotates and applies a torque to the fan 38 such that the fan 38 (FIG. 1) rotates at a fan speed $\Omega_{fan}$. Further, mechanical power is transferred from the drive shaft (e.g., LP shaft 36) to the fan shaft 45 (FIG. 2) through the epicyclic gear assembly 279 of the gearbox assembly 246 such that the fan 38 rotates with a fan power $HP_{fan}$.

As shown in FIG. 3, during operation, the planet gear 384 rotates in a counterclockwise direction at a planet gear speed $\Omega_p$ about the axis 13 (FIG. 2). At the same time, the planet gear 384 rotates in a counterclockwise direction about the longitudinal centerline 12 (FIG. 2) such that the planet carrier 288 (FIG. 2) rotates in a counterclockwise direction at a planet carrier speed $\Omega_c$ about the longitudinal centerline 12 (FIG. 1). Forces are exerted on the planet gear 384 due to the rotation of the planet gear 384 and the rotation of the planet carrier 288 (FIG. 2). For example, the forces include pinch forces $F_p$, tangential forces $F_t$, centrifugal forces $F_c$, and outward radial forces $F_r$. For example, torsional movement of the LP shaft 36 (FIG. 2) causes the sun gear 282 (FIG. 2) to exert resultant radial and transverse forces on the planet gear rim 391. The resultant radial and transverse forces exert the pinch forces $F_p$ and the tangential forces $F_t$ on the planet gear rim 391. The outward radial forces $F_r$ on the planet gear rim 391 include a centrifugal force of the planet gear 384 due to rotation of the planet gear 384 about the axis 13. The centrifugal forces $F_c$ include a centrifugal force on the planet gear 384 due to rotation of the planet gear 384 about the longitudinal centerline 12 in the planetary type configuration of the gearbox assembly 246.

The forces exerted on the planet gear 384 cause deformation or bending of the planet gear rim 391. The deformation or bending of the planet gear rim 391 is caused by the forces pulling down and pushing in on the planet gear rim 391. As a result, the forces cause the planet gear rim 391 to bend radially toward the planet pin 390 such that the inner radius 393 of the planet gear rim 391 is reduced or deformed to a deformed inner radius 395. The deformed inner radius 395 is defined to a deformed portion 396 of the planet gear rim 391. The total deflection of the deformed portion 396 of the planet gear rim 391 due to the forces exerted on the planet gear rim 391 is a function of the material properties of the planet gear 384 (e.g., an elastic modulus and a density of a material of the planet gear 384), a thickness of the planet gear rim 391, the radius $r_p$ of the planet pin 390, a width of the planet gear rim 391, a radius of the sun gear 282, the planet carrier speed $\Omega_c$, the planet gear speed $\Omega_p$, a number of planet gears 384 $N_p$, and the fan power $HP_{fan}$. Additionally, the planet pin 390 is pushed radially outward within the interior 392 of the planet gear 384 due to the centrifugal forces $F_c$. Thus, a clearance between the planet gear rim 391 and the planet pin 390 is reduced at a circumferential location of the deformed portion 396 of the planet gear rim 391.

The circumferential location of the deformed portion 396 is between pi radians and pi over two radians (e.g., between one hundred eighty degrees and ninety degrees) on an axis 399 of the planet gear 384. The circumferential location of maximum deformation of the deformed portion 396 is at about 1.967 radians (e.g., about one hundred twelve point seven degrees). Such a reduction in the clearance may cause contact between the planet gear rim 391 and the planet pin 390. As a result, the planet gear 384 is subject to wear and decreased load capacity. Thus, the efficiency of the planet gear 384 is reduced, and the efficiency of the gearbox assembly 246 (FIG. 2) is reduced. Therefore, embodiments of the present disclosure provide for an improved planet pin, as detailed further below.

Figure 4B:
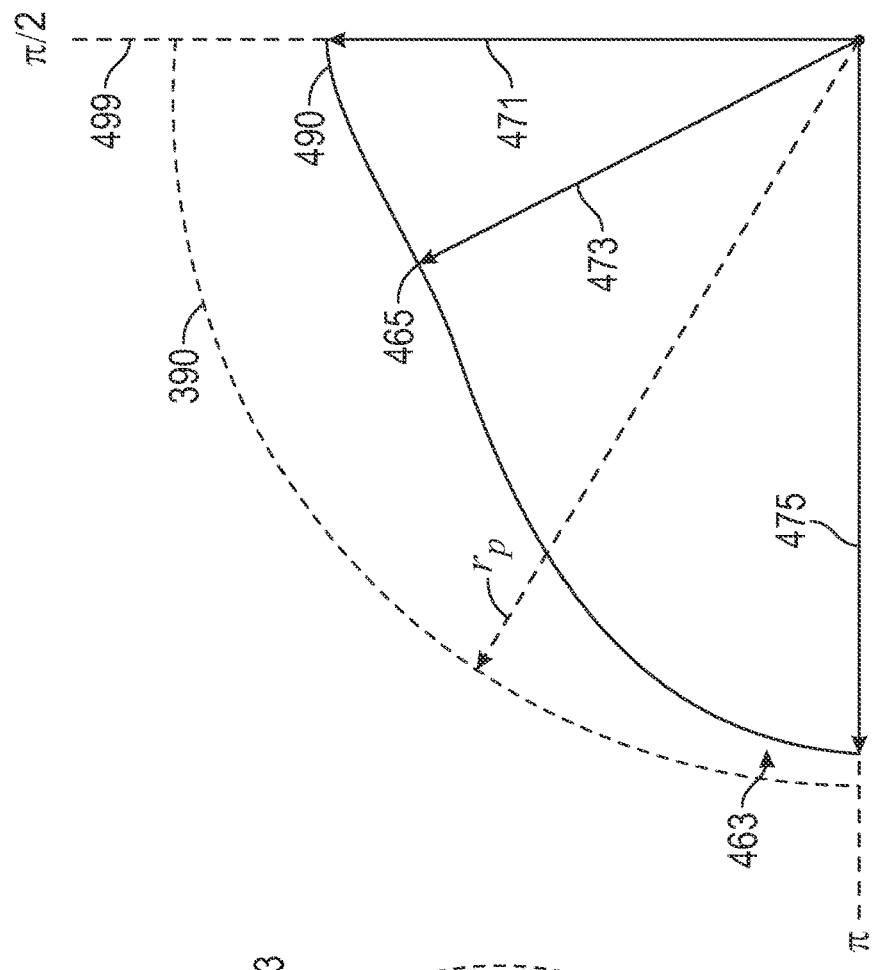
FIG. 4B is an enlarged partial schematic front view, taken at detail 4B in FIG. 4A, of the contoured planet pin, according to the present disclosure.
Figure 4A:
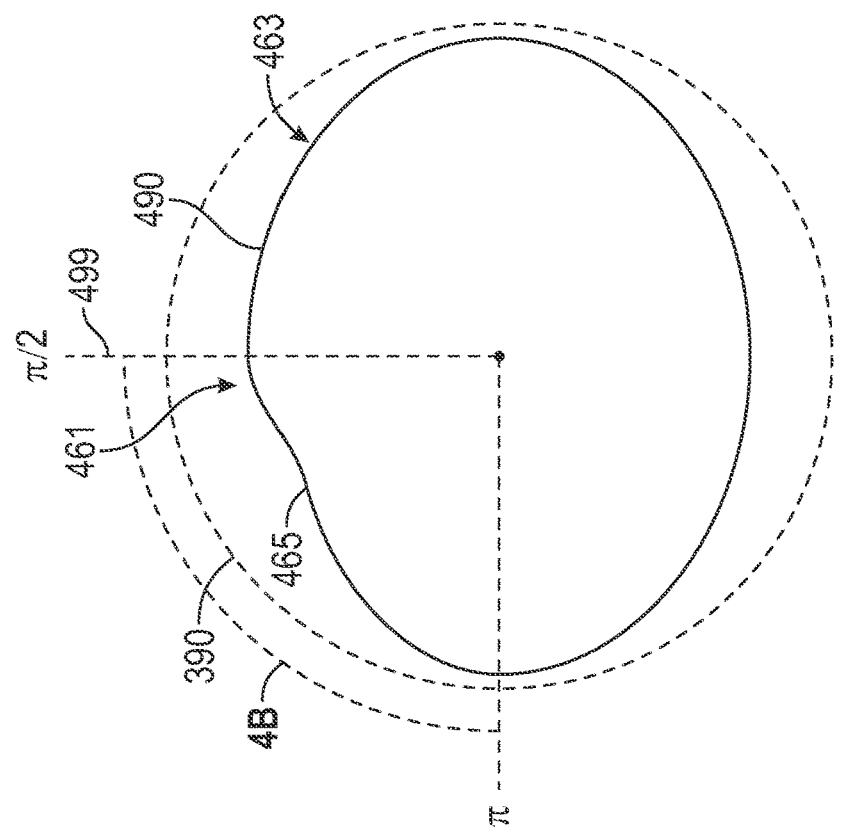
FIG. 4A is a schematic front view of a contoured planet pin for a gearbox assembly, according to the present disclosure.

FIG. 4A is a schematic front view of a planet pin 490, according to an embodiment of the present disclosure. The planet pin 490 may be used in the gearbox assembly 246 of FIG. 2. As shown in FIG. 4A, the planet pin 490 includes a planet pin shape 461. The planet pin shape 461 is defined as a circumferential shape of the planet pin 490. The planet pin shape 461 includes a generally elliptical shape 463 that includes a contoured portion 465. The contoured portion 465 generally corresponds to the deformed portion 396 of the planet gear 384 (FIG. 3). For example, the contoured portion 465 defines an irregular portion of the planet pin shape 461 that is misshaped relative to the rest of the planet pin shape 461 (e.g., relative to the elliptical shape 463). In this way, the planet pin shape 461 of the planet pin 490 provides for a clearance between the planet pin 490 and the planet gear rim 391 (FIG. 3) when the planet gear rim 391 deforms or bends such that there is no contact between the planet pin 490 and the planet gear rim 391.

FIG. 4B is an enlarged, partial schematic front view, taken at detail 4B in FIG. 4A, of the planet pin 490, according to an embodiment of the present disclosure. As shown in FIG. 4B, the planet pin shape 461 of the planet pin 490 includes a minor axis radius 471, a contoured portion radius 473, and a major axis radius 475. The minor axis radius 471 and the major axis radius 475 include a minor axis and a major axis of the elliptical shape 463, respectively. The contoured portion radius 473 is a radius to the contoured portion 465 of the planet pin 490 at a location of a maximum compression of the planet pin 490 (and, thus, a location of a minimum radius of the planet pin 490). Thus, the contoured portion radius 473 is located between pi radians and pi over two radians (e.g., between one hundred eighty degrees and ninety degrees) on an axis 499 of the planet pin 490. A minimum of the contoured portion radius 473 (e.g., a maximum deflection of the contoured portion 465) is defined at about 1.967 radians (e.g., about one hundred twelve point seven degrees) on the axis of the planet pin 490.

Referring to FIG. 4B, the minor axis radius 471, the contoured portion radius 473, and the major axis radius 475 are each expressed relative to a planet pin radius $r_p$ when the planet pin is a circular shape (e.g., the planet pin 390 of FIG. 3). For example, the minor axis radius 471 is equal to a minor axis deflection $a_1$ (e.g., a negative value) added to the planet pin radius $r_p$. The contoured portion radius 473 is equal to a contoured portion deflection $a_2$ (e.g., a negative value) added to the planet pin radius $r_p$. And the major axis radius 475 is equal to a major axis deflection $a_3$ (e.g., a negative value) added to the planet pin radius $r_p$. The minor axis deflection $a_1$, the contoured portion deflection $a_2$, and the major axis deflection $a_3$ are each elastic deflections of the planet pin 490 with respect to the planet pin radius $r_p$ when the gearbox is loaded and the plant pin is circular in shape in the unloaded condition (i.e., no torque being transmitted from the LP shaft to the fan shaft). Thus, the minor axis deflection $a_1$, the contoured portion deflection $a_2$, and the major axis deflection $a_3$ each defines an amount that the planet pin shape 461 of the planet pin 490 is deflected or reduced with respect to the planet pin radius $r_p$ for the circular planet pin 390 (FIG. 3). It is desirable to avoid surface to surface contact between the inner rim of the planet gear and the outer surface of the planet pin as this will improve gearbox efficiency in delivering torque from the drive shaft to the fan shaft.

When developing a turbine engine, the interplay among components can make it particularly difficult to select or to develop one component during engine design and prototype testing, especially, when some components are at different stages of completion. For example, one or more components may be nearly complete, yet one or more other components may be in an initial or a preliminary phase such that only one (or a few) design parameters are known. The inventors desire to arrive at design possibilities at an early stage of design, so that the downstream selection of candidate improved designs in terms of efficiency, weight, packaging size (volume), given the tradeoffs, become more feasible. Heretofore, the process has sometimes been more ad hoc, selecting one design or another without knowing the impact when a concept is first taken into consideration and, most importantly, whether that design provides an improvement. For example, and referring to FIG. 1, various aspects of the fan 38 design, the combustion section 26 design, the compressor section 21 design, the turbine section 27 design, etc., may not be known, but such components impact a gear ratio of the gearbox assembly 246 (FIG. 2) and the torque of the fan 38 and, thus, may influence the design of components of the gearbox assembly 246. The design of the gearbox assembly 246 includes a design of the planet pin 290. For example, the design of the planet pin 290 includes a design of a shape and a size of the planet pin 290, as detailed further below.

The inventors sought to improve the efficiency of the gearbox by avoiding metal to metal contact in the gearbox, without resorting to ad-hoc approaches to arrive at higher efficiency, and while taking into account the environment specific to the turbine engine or flight mission, constraints on the design, feasibility, manufacturing, certification requirements, etc., to arrive at a more favorable design of the planet pin for an improved efficiency of the gearbox assembly and thereby an improved engine efficiency, i.e., improved efficiency in the conversion of kinetic energy in the fluid stream to mechanical energy in the turbine shaft.

During the course of the evaluation of different embodiments as set forth herein, the inventors discovered, unexpectedly, that an improved planet pin shape of the planet pin may be made using only a relatively few engine parameters. This development was based on, among other things, the recognition that the planet pin shape 461 of the planet pin 490 is related to the efficiency of a gearbox assembly. From this initial recognition and other developments that were the by-product of studying several different engine configurations that included a gearbox assembly (including the configurations disclosed herein), the inventors ultimately discovered that there exists relationships between the torque of the fan 38 (at a maximum power and a maximum speed of the fan 38) and the gearbox ratio (GR), which uniquely identifies a finite and readily ascertainable (in view of this disclosure) number of embodiments suitable for a particular architecture that addresses the size and the shape of the planet pin 490 to avoid contact between the planet pin 490 and the planet gear rim 391 (FIG. 3). The inventors define this modified shape of the planet pin (resulting in improved gearbox efficiency) in terms of what a deflected shape of a circular planet pin would resemble for the particular engine architecture, when a large torque is being transmitted from the drive shaft to the fan shaft. That is, the shape of the improved planet pin is defined by the minor axis deflection $a_1$ (of a circular planet pin) the contoured portion deflection $a_2$ (relative to a circular planet pin), and the major axis deflection $a_3$ (relative to a circular planet pin) illustrated in FIGS. 4A and 4B. The minor axis deflection $a_1$ is defined according to the following relationship (1) and depends on the fan power and the fan speed of the fan 38 and the gearbox ratio (GR) of the gearbox assembly 246:

$$a_1 = 1.07 * 10^{-9} r_p^2 \left[ -6.764 * 10^{-5} r_p^3 \frac{GR}{GR-2} \Omega_{fan}^2 - 33914.7 \frac{1}{N_p} \left( \frac{HP_{fan}}{\Omega_{fan}} \right) \frac{GR-2}{GR} \right] \quad (1)$$

The contoured portion deflection $a_2$ is defined according to the following relationship (2) and depends on the power and the speed of the fan 38 and the gearbox ratio (GR) of the gearbox assembly 246:

$$a_2 = 1.07 * 10^{-9} r_p^2 \left[ -8.9987 * 10^{-5} r_p^3 \frac{GR}{GR-2} \Omega_{fan}^2 - 27547.05 \frac{1}{N_p} \left( \frac{HP_{fan}}{\Omega_{fan}} \right) \frac{GR-2}{GR} \right] \quad (2)$$

The major axis deflection $a_3$ is defined according to the following relationship (3) and depends on the power and the speed of the fan 38 and the gearbox ratio (GR) of the gearbox assembly 246:

$$a_3 = 1.07 * 10^{-9} r_p^2 \left[ -68934.52 \frac{1}{N_p} \left( \frac{HP_{fan}}{\Omega_{fan}} \right) \frac{GR-2}{GR} \right] \quad (3)$$

where "$r_p$" is the planet pin radius of a circular planet pin 390 (FIG. 3), "$N_p$" is the number of planet gears 284 (FIG. 2) in the gearbox assembly 246, "$HP_{fan}$" is the fan power of the fan 38 (FIG. 1), "$\Omega_{fan}$" is the fan speed of the fan 38, and "GR" is the gear ratio of the gearbox assembly 246. These three values, as defined by (1), (2), (3), describe the outer contour or the outer shape of a planet pin relative to a circular planet pin $r_p$. Referring again to FIGS. 4A, 4B, the outer shape of a planet pin according to the disclosure may thus be determined by adding the respective values (e.g., negative values) to $r_p$ to determine the surface located furthest from the circular pin surface ($r_p$+a2, distance 473), the location nearer to the circular surface ($r_p$+a1, distance 471) and the location closest to the circular surface ($r_p$+a3, distance 475). The vales defined by (1), (2), and (3) are negative values such that adding these values to $r_p$ functionally subtracts these values from $r_p$.

As discussed further below, the inventors identified a suitable range for each of the minor axis deflection $a_1$, the contoured portion deflection $a_2$, and the major axis deflection $a_3$ that enables a planet pin 490 design such that a clearance between the planet pin 490 and the planet gear rim 391 (FIG. 3) can be substantially maintained when the planet gear rim 391 of the planet gear 384 (FIG. 3) deforms or bends during operation of the gearbox assembly 246 at engine loading conditions (e.g., take off and climb). Even when there may be contact, it is believed that the contoured shaped defined by (1), (2) and (3) will result in improved efficiency over an elliptical or circular-shaped planet pin.

Table 1 shows exemplary embodiments 1 to 8 identifying the minor axis deflection $a_1$, the contoured portion deflection $a_2$, and the major axis deflection $a_3$ for various turbine engines. Embodiments 1 to 8 may represent the turbine engine 10 described with respect to FIG. 1 and can be applied to the gearbox assembly 246 described in FIG. 2. In Table 1, the minor axis deflection $a_1$ is determined based on the relationship (1), the contoured portion deflection $a_2$ is determined based on the relationship (2), and the major axis deflection $a_3$ is determined based on the relationship (3), described above.

TABLE 1

| Emb. | Fan Power (HP) | Fan Speed (RPM) | Gear Ratio | $r_p$ (in) | $N_p$ | $a_1$ (in) | $a_2$ (in) | $a_3$ (in) |
|---|---|---|---|---|---|---|---|---|
| 1 | 7000 | 1000 | 3 | 1.25 | 6 | −2.27e−05 | −1.88e−05 | −4.48e−05 |
| 2 | 90000 | 3500 | 3 | 2.5 | 3 | −9.08e−04 | −8.72e−04 | −1.32e−03 |
| 3 | 90000 | 3500 | 8 | 2.5 | 3 | −1.57e−03 | −1.34e−03 | −2.96e−03 |
| 4 | 30000 | 2500 | 3.5 | 1.5 | 5 | −9.20e−05 | −7.89e−05 | −1.71e−04 |
| 5 | 35000 | 3500 | 8 | 2.0 | 5 | −2.56e−04 | −2.27e−04 | −4.43e−04 |
| 6 | 35000 | 2500 | 3.5 | 2.5 | 5 | −3.75e−04 | −3.58e−04 | −5.53e−04 |
| 7 | 7000 | 3500 | 3 | 1.2 | 6 | −1.30e−05 | −1.20e−05 | −1.20e−05 |
| 8 | 90000 | 1000 | 8 | 4 | 3 | −5.20e−03 | −4.20e−03 | −1.10e−02 |

The fan power $HP_{fan}$ is between seven thousand horsepower and ninety thousand horsepower. In some examples, the fan power $HP_{fan}$ is between seven thousand horsepower and thirty-four thousand horsepower. The fan speed $\Omega_{fan}$ is between one thousand rpm and three thousand five hundred rpm. The gear ratio is between three and eight. In some examples, the gear ratio is between three and five. The planet pin radius $r_p$ is between one point two inches and four inches. In some examples, the planet pin radius $r_p$ is between one point four inches and two point five inches. The number of planet gears 384 is between three and six. The values of fan power, fan speed, gear ratio, planet pin radius, and number of planet gears are selected based on engine specification requirements for a particular engine. For example, the fan power for larger engines is greater than the fan power for smaller engines. The fan speed is the fan speed at a maximum for a particular engine, for example, at takeoff conditions. The gear ratio is selected based on whether the engine is a ducted fan engine (e.g., gear ratio less than four) or an unducted fan engine (e.g., gear ratio greater than four). The planet pin radius of the planet pin in larger engines is greater than the planet pin radius for planet pins in smaller engines. A greater number of planet gears is generally used in gearbox assemblies for smaller engines as compared to the number of planet gears used in gearbox assemblies for larger engines.

FIGS. 5 to 19 illustrate graphs of the minor axis deflection $a_1$, the contoured portion deflection $a_2$, and the major axis deflection $a_3$ as functions of the variables detailed above. While the graphs of FIGS. 5 to 19 show trends of the minor axis deflection $a_1$, the contoured portion deflection $a_2$, and the major axis deflection $a_3$ for the different variables, the trends between two particular embodiments may be different than detailed below due to one or more variables affecting one or more other variables between two different embodiments.

Table 2 shows exemplary embodiments 9 to 11 identifying minimum and maximum values of the minor axis deflection $a_1$, the contoured portion deflection $a_2$, and the major axis deflection $a_3$ for various turbine engines at various fan powers $HP_{fan}$ when the other variables remain the same. Embodiments 9 to 11 may represent the turbine engine 10 described with respect to FIG. 1 and can be applied to the gearbox assembly 246 described in FIG. 2. In Table 2, the minor axis deflection $a_1$ is determined based on the relationship (1), the contoured portion deflection $a_2$ is determined based on the relationship (2), and the major axis deflection $a_3$ is determined based on the relationship (3), described above.

Figure 5:
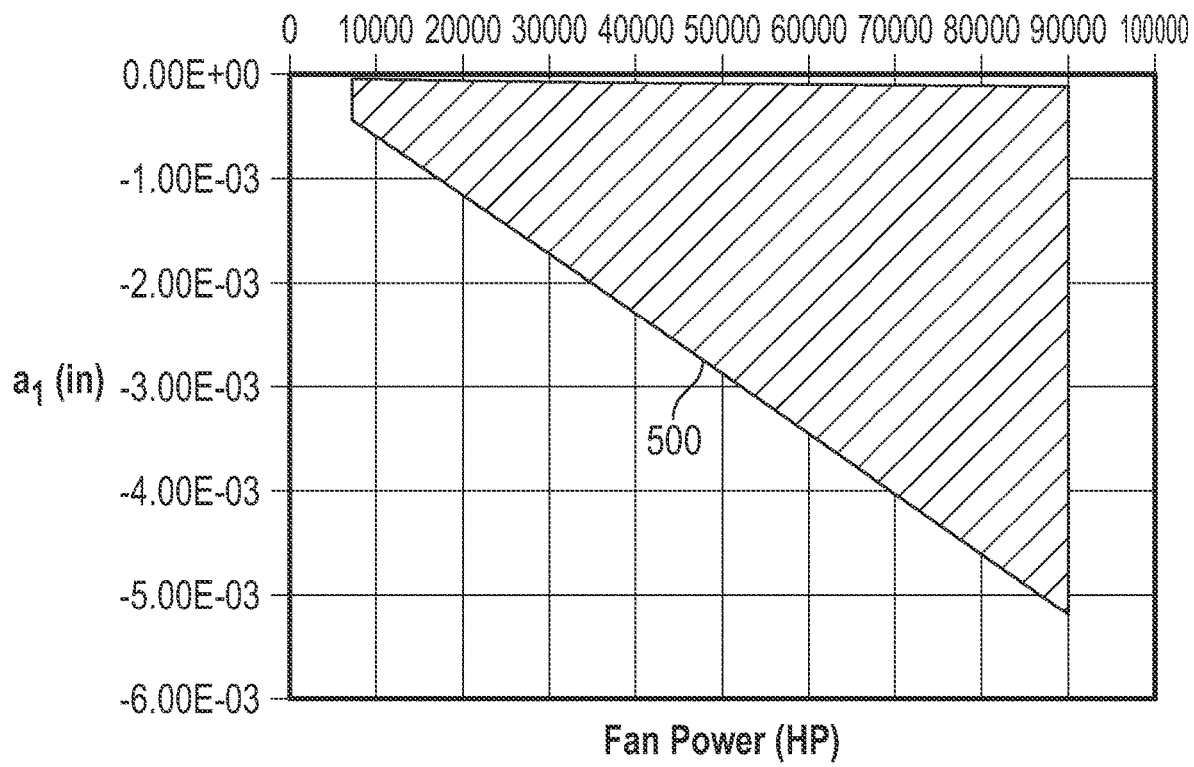
FIG. 5 is a graph illustrating a minor axis deflection as a function of fan power of a fan of a turbine engine, according to embodiments of the present disclosure.

FIG. 5 represents, in graph form, the minor axis deflection $a_1$ as a function of the fan power $HP_{fan}$. Tables 1 and 2 and FIG. 5 show that the minor axis deflection $a_1$ may be changed based on the fan power $HP_{fan}$ of the fan 38. An area 500 may represent the boundaries of the minor axis deflection $a_1$ as a function of the fan power $HP_{fan}$ in which a particular planet pin 490 (FIG. 4A) is designed. As shown in FIG. 5, the minor axis deflection $a_1$ is greater than or equal to −5.2e-3 inches and less than or equal to −1.3e-5 inches when the fan power $HP_{fan}$ is between seven thousand horsepower and ninety thousand horsepower, respectively. Thus, as the fan power $HP_{fan}$ increases, the minor axis deflection $a_1$ decreases. For example, the higher the fan power $HP_{fan}$, the greater the deflection of the minor axis radius 471 needs to be from the planet pin radius $r_p$ due to a greater deformation of the planet gear rim 391 as a result of the higher fan power $HP_{fan}$.

Figure 6:
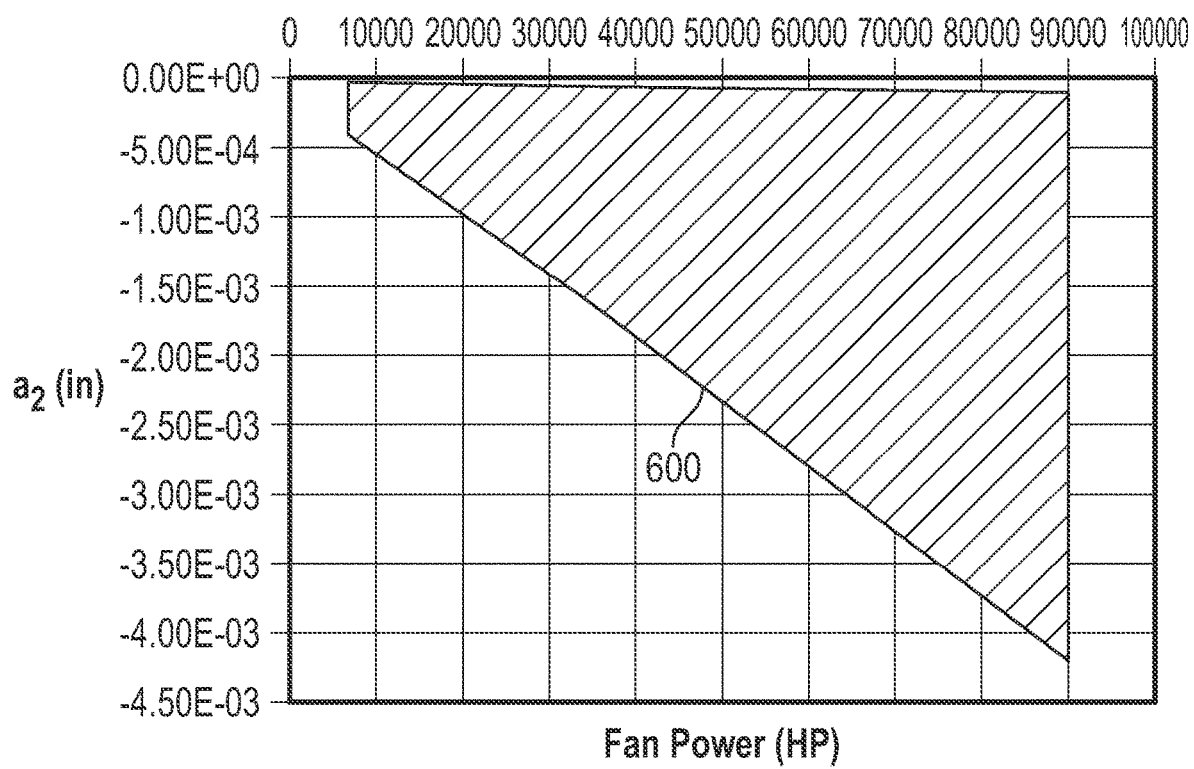
FIG. 6 is a graph illustrating a contoured portion deflection as a function of fan power of a fan of a turbine engine, according to embodiments of the present disclosure.

FIG. 6 represents, in graph form, the contoured portion deflection $a_2$ as a function of the fan power $HP_{fan}$. Tables 1 and 2 and FIG. 6 show that the contoured portion deflection $a_2$ may be changed based on the fan power $HP_{fan}$ of the fan 38. An area 600 may represent the boundaries of the contoured portion deflection $a_2$ as a function of the fan power $HP_{fan}$ in which a particular planet pin 490 is designed. As shown in FIG. 6, the contoured portion deflection $a_2$ is greater than or equal to −4.2e-03 inches and less than or equal to −1.2e-05 inches when the fan power $HP_{fan}$ is between seven thousand horsepower and ninety thousand horsepower, respectively. Thus, as the fan power $HP_{fan}$ increases, the contoured portion deflection $a_2$ decreases. For example, the higher the fan power $HP_{fan}$, the greater the deflection of the contoured portion radius 473 needs to be from the planet pin radius $r_p$ due to a greater deformation of the planet gear rim 391 as a result of the higher fan power $HP_{fan}$.

Figure 7:
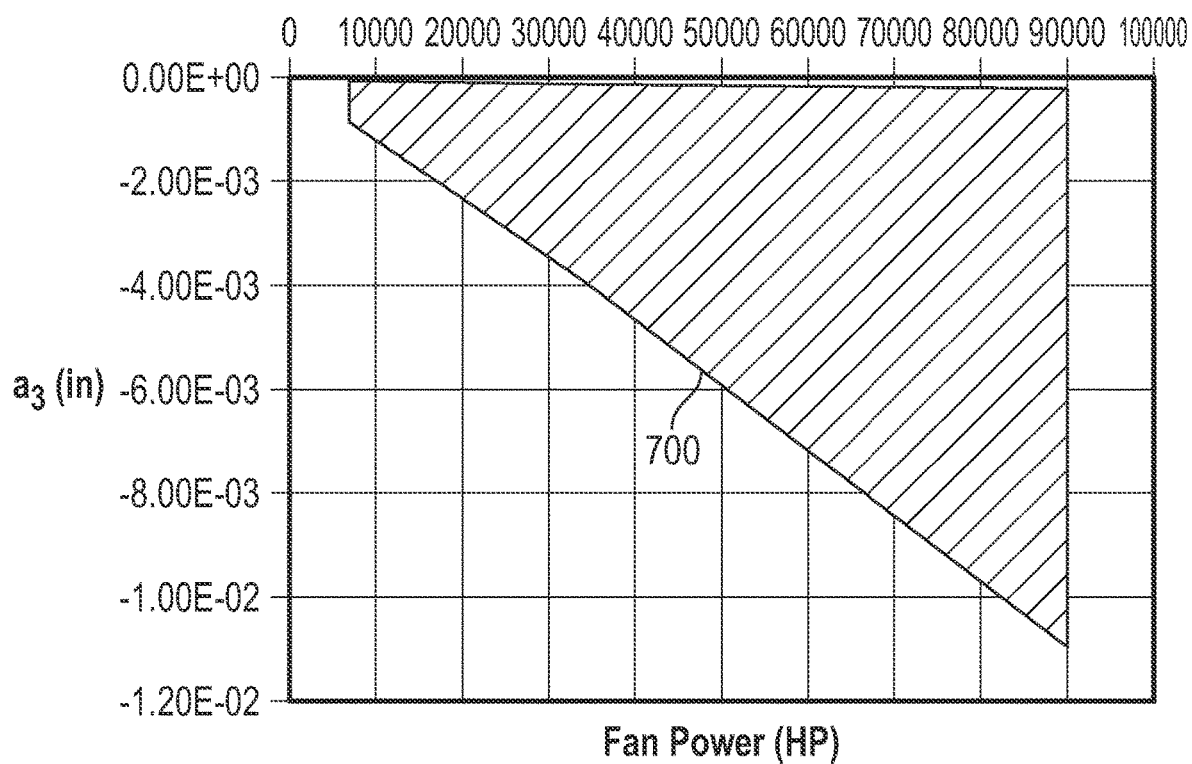
FIG. 7 is a graph illustrating a major axis deflection as a function of fan power of a fan of a turbine engine, according to embodiments of the present disclosure.

FIG. 7 represents, in graph form, the major axis deflection $a_3$ as a function of the fan power $HP_{fan}$. Tables 1 and 2 and FIG. 7 show that the major axis deflection $a_3$ may be changed based on the fan power $HP_{fan}$ of the fan 38. An area 700 may represent the boundaries of the major axis deflection $a_3$ as a function of the fan power $HP_{fan}$ in which a particular planet pin 490 is designed. As shown in FIG. 7, the major axis deflection $a_3$ is greater than or equal to −1.1e-02 inches and less than or equal to −1.2e-05 inches when the fan power $HP_{fan}$ is between seven thousand horsepower and ninety thousand horsepower, respectively. Thus, as the fan power $HP_{fan}$ increases, the major axis deflection $a_3$ decreases. For example, the higher the fan power $HP_{fan}$, the greater the deflection of the major axis radius 475 needs to be from the planet pin radius $r_p$ due to a greater deformation of the planet gear rim 391 as a result of the higher fan power $HP_{fan}$.

Table 3 shows exemplary embodiments 12 to 14 identifying minimum and maximum values of the minor axis deflection $a_1$, the contoured portion deflection $a_2$, and the major axis deflection $a_3$ for various turbine engines at various fan speeds $\Omega_{fan}$ when the other variables remain the same. Embodiments 12 to 14 may represent the turbine engine 10 described with respect to FIG. 1 and can be applied to the gearbox assembly 246 described in FIG. 2. In Table 3, the minor axis deflection $a_1$ is determined based on the relationship (1), the contoured portion deflection $a_2$ is determined based on the relationship (2), and the major axis deflection $a_3$ is determined based on the relationship (3), described above.

TABLE 2

| Emb. | Fan Power (HP) | Min. $a_1$ (in) | Max. $a_1$ (in) | Min. $a_2$ (in) | Max. $a_2$ (in) | Min. $a_3$ (in) | Max. $a_3$ (in) |
|---|---|---|---|---|---|---|---|
| 9 | 7000 | −4.06e−04 | −1.30e−05 | −3.86e−04 | −1.27e−05 | −8.07e−04 | −1.28e−05 |
| 10 | 35000 | −1.99e−03 | −3.96e−05 | −1.62e−03 | −3.64e−05 | −4.30e−03 | −6.40e−05 |
| 11 | 90000 | −5.11e−03 | −8.91e−05 | −4.16e−03 | −7.66e−05 | −1.04e−02 | −1.65e−04 |

TABLE 3

| Emb. | Fan Speed (RPM) | Min. $a_1$ (in) | Max. $a_1$ (in) | Min. $a_2$ (in) | Max. $a_2$ (in) | Min. $a_3$ (in) | Max. $a_3$ (in) |
|---|---|---|---|---|---|---|---|
| 12 | 1000 | −5.11e−03 | −2.27e−05 | −4.16e−03 | −1.88e−05 | −1.04e−02 | −4.48e−05 |
| 13 | 2500 | −2.10e−03 | −1.30e−05 | −1.74e−03 | −1.27e−05 | −4.15e−03 | −1.79e−05 |
| 14 | 3500 | −1.57e−03 | −1.44e−05 | −1.34e−03 | −1.52e−05 | −2.96e−03 | −1.28e−05 |

Figure 8:
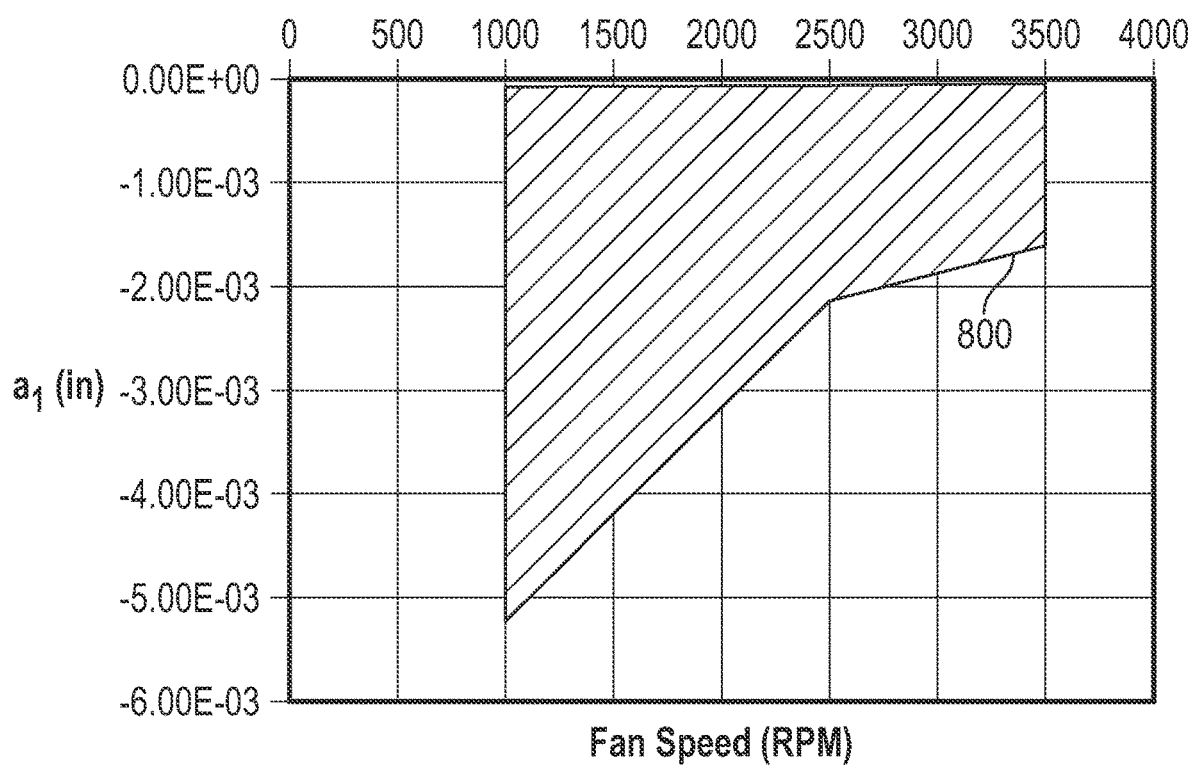
FIG. 8 is a graph illustrating a minor axis deflection as a function of fan speed of a fan of a turbine engine, according to embodiments of the present disclosure.

FIG. 8 represents, in graph form, the minor axis deflection $a_1$ as a function of the fan speed $\Omega_{fan}$. Tables 1 and 3 and FIG. 8 show that the minor axis deflection $a_1$ may be changed based on the fan speed $\Omega_{fan}$ of the fan 38. An area 800 may represent the boundaries of the minor axis deflection $a_1$ as a function of the fan speed $\Omega_{fan}$ in which a particular planet pin 490 is designed. As shown in FIG. 8, the minor axis deflection $a_1$ is greater than or equal to −5.2e-03 inches and less than or equal to −1.3e-05 inches when the fan speed $\Omega_{fan}$ is between one thousand rpm and three thousand five hundred rpm, respectively. Thus, as the fan speed $\Omega_{fan}$ increases, the minor axis deflection $a_1$ increases. For example, the higher the fan speed $\Omega_{fan}$, the lesser the deflection of the minor axis radius 471 needs to be from the planet pin radius $r_p$ due to a smaller deformation of the planet gear rim 391 as a result of the higher fan speed $\Omega_{fan}$.

Table 4 shows exemplary embodiments 15 to 17 identifying minimum and maximum values of the minor axis deflection $a_1$, the contoured portion deflection $a_2$, and the major axis deflection $a_3$ for various turbine engines at various gear ratios of the gearbox assembly 246 when the other variables remain the same. Embodiments 15 to 17 may represent the turbine engine 10 described with respect to FIG. 1 and can be applied to the gearbox assembly 246 described in FIG. 2. In Table 4, the minor axis deflection $a_1$ is determined based on the relationship (1), the contoured portion deflection $a_2$ is determined based on the relationship (2), and the major axis deflection $a_3$ is determined based on the relationship (3), described above.

TABLE 4

| Emb. | Gear Ratio | Min. $a_1$ (in) | Max. $a_1$ (in) | Min. $a_2$ (in) | Max. $a_2$ (in) | Min. $a_3$ (in) | Max. $a_3$ (in) |
|---|---|---|---|---|---|---|---|
| 15 | 3 | −2.29e−03 | −1.30e−05 | −1.87e−03 | −1.27e−05 | −4.61e−03 | −1.28e−05 |
| 16 | 5 | −4.09e−03 | −1.58e−05 | −3.33e−03 | −1.52e−05 | −8.30e−03 | −2.30e−05 |
| 17 | 8 | −5.11e−03 | −1.78e−05 | −4.16e−03 | −1.63e−05 | −1.04e−02 | −2.88e−05 |

Figure 9:
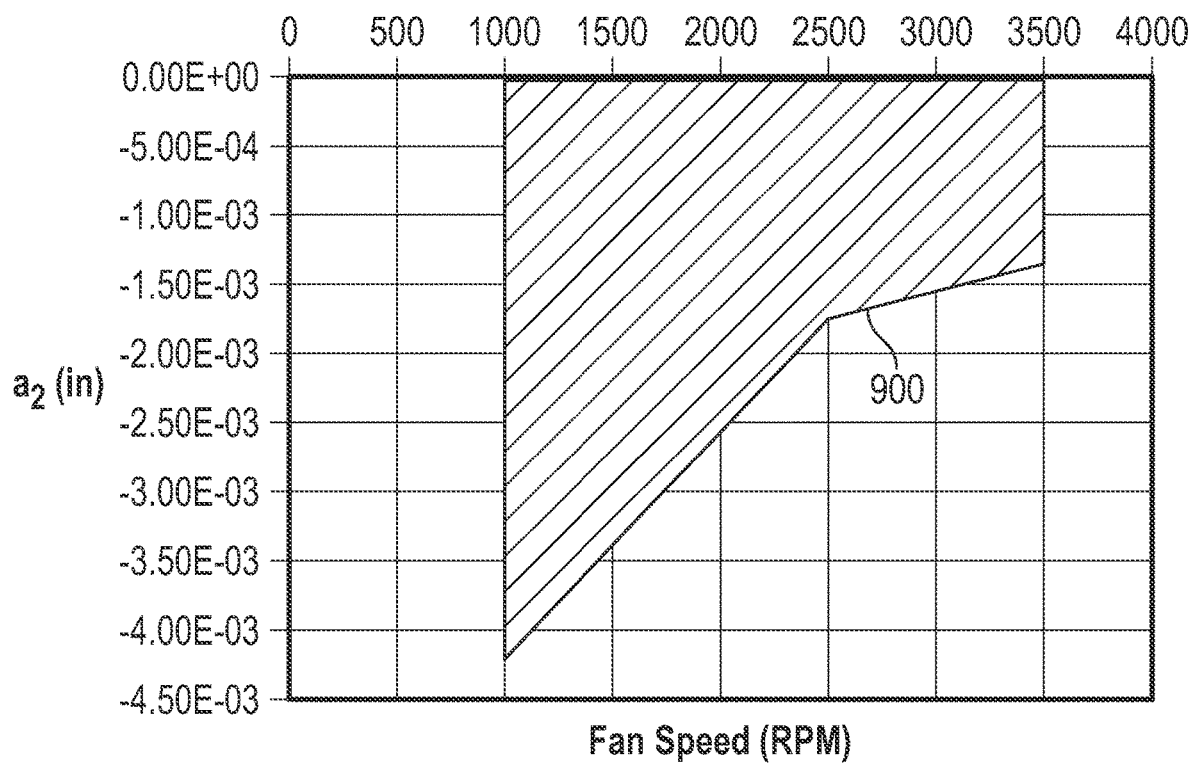
FIG. 9 is a graph illustrating a contoured portion deflection as a function of fan speed of a fan of a turbine engine, according to embodiments of the present disclosure.

FIG. 9 represents, in graph form, the contoured portion deflection $a_2$ as a function of the fan speed $\Omega_{fan}$. Tables 1 and 3 and FIG. 9 show that the contoured portion deflection $a_2$ may be changed based on the fan speed $\Omega_{fan}$ of the fan 38. An area 900 may represent the boundaries of the contoured portion deflection $a_2$ as a function of the fan speed $\Omega_{fan}$ in which a particular planet pin 490 is designed. As shown in FIG. 9, the contoured portion deflection $a_2$ is greater than or equal to −4.2e-03 inches and less than or equal to −1.2e-05 inches when the fan speed $\Omega_{fan}$ is between one thousand rpm and three thousand five hundred rpm, respectively. Thus, as the fan speed $\Omega_{fan}$ increases, the contoured portion deflection $a_2$ increases. For example, the higher the fan speed $\Omega_{fan}$, the lesser the deflection of the contoured portion radius 473 needs to be from the planet pin radius $r_p$ due to a smaller deformation of the planet gear rim 391 as a result of the higher fan speed $\Omega_{fan}$.

Figure 10:
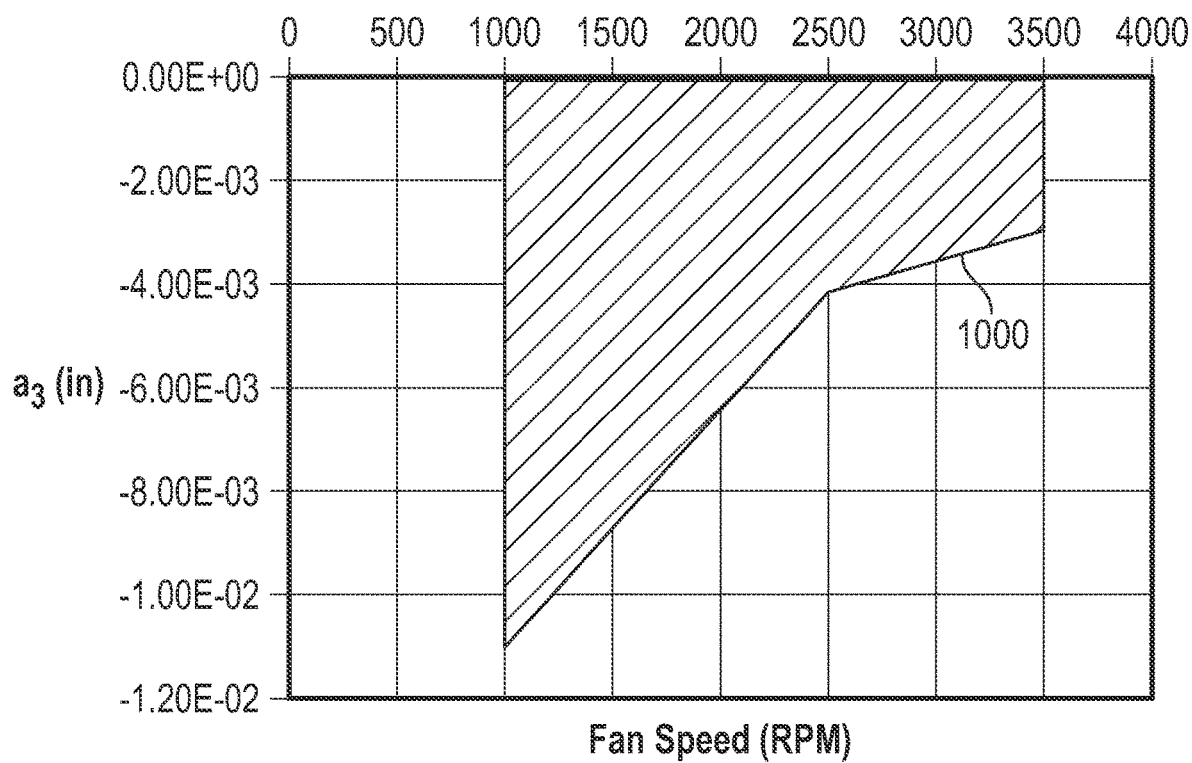
FIG. 10 is a graph illustrating a major axis deflection as a function of fan speed of a fan of a turbine engine, according to embodiments of the present disclosure.

FIG. 10 represents, in graph form, the major axis deflection $a_3$ as a function of the fan speed $\Omega_{fan}$. Tables 1 and 3 and FIG. 10 show that the major axis deflection $a_3$ may be changed based on the fan speed $\Omega_{fan}$ of the fan 38. An area 1000 may represent the boundaries of the major axis deflection $a_3$ as a function of the fan speed $\Omega_{fan}$ in which a particular planet pin 490 is designed. As shown in FIG. 10, the major axis deflection $a_3$ is greater than or equal to −1.1e-02 inches and less than or equal to −1.2e-05 inches when the fan speed $\Omega_{fan}$ is between one thousand rpm and three thousand five hundred rpm, respectively. Thus, as the fan speed $\Omega_{fan}$ increases, the major axis deflection $a_3$ increases. For example, the higher the fan speed $\Omega_{fan}$, the lesser the deflection of the major axis radius 475 needs to be from the planet pin radius $r_p$ due to a smaller deformation of the planet gear rim 391 as a result of the higher fan speed $\Omega_{fan}$.

Figure 11:
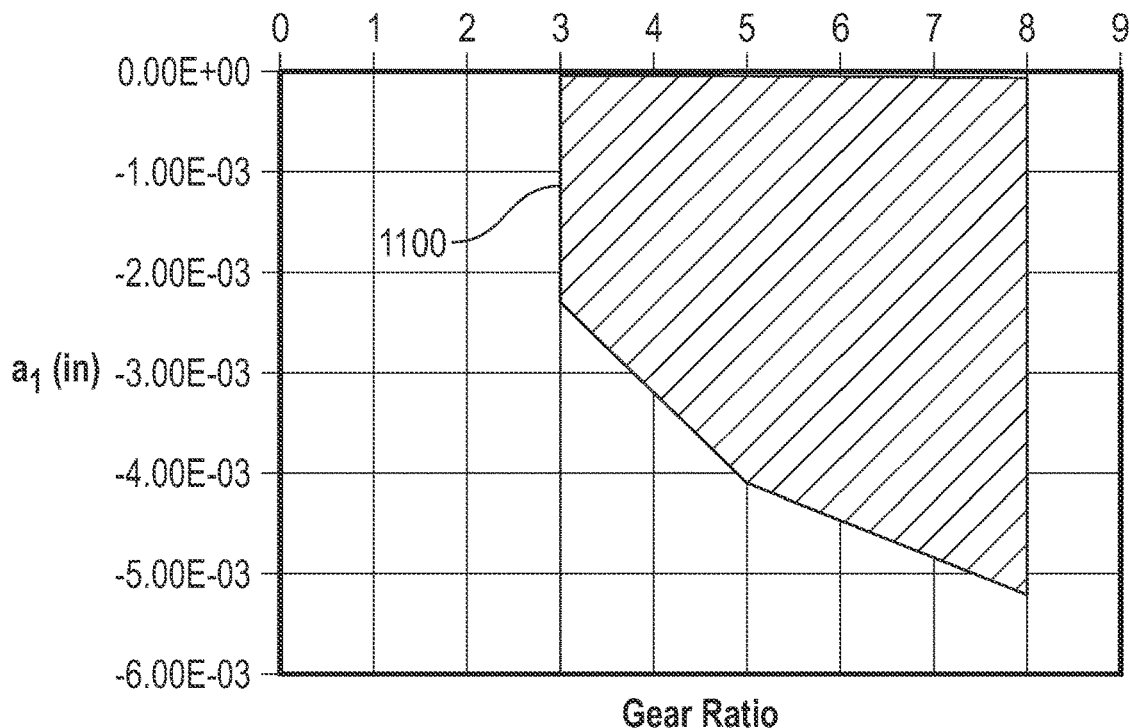
FIG. 11 is a graph illustrating a minor axis deflection as a function of a gear ratio of a gearbox assembly, according to embodiments of the present disclosure.

FIG. 11 represents, in graph form, the minor axis deflection $a_1$ as a function of the gear ratio. Tables 1 and 4 and FIG. 11 show that the minor axis deflection $a_1$ may be changed based on the gear ratio of the gearbox assembly 246. An area 1100 may represent the boundaries of the minor axis deflection $a_1$ as a function of the gear ratio in which a particular planet pin 490 is designed. As shown in FIG. 11, the minor axis deflection $a_1$ is greater than or equal to −5.2-03 inches and less than or equal to −1.3e-05 inches when the gear ratio is between three and eight, respectively. Thus, as the gear ratio increases, the minor axis deflection $a_1$ decreases. For example, the higher the gear ratio, the greater the deflection of the minor axis radius 471 needs to be from the planet pin radius $r_p$ due to a greater deformation of the planet gear rim 391 as a result of the higher gear ratio (e.g., the torque on the planet gear 384 is increased as the gear ratio increases).

Figure 12:
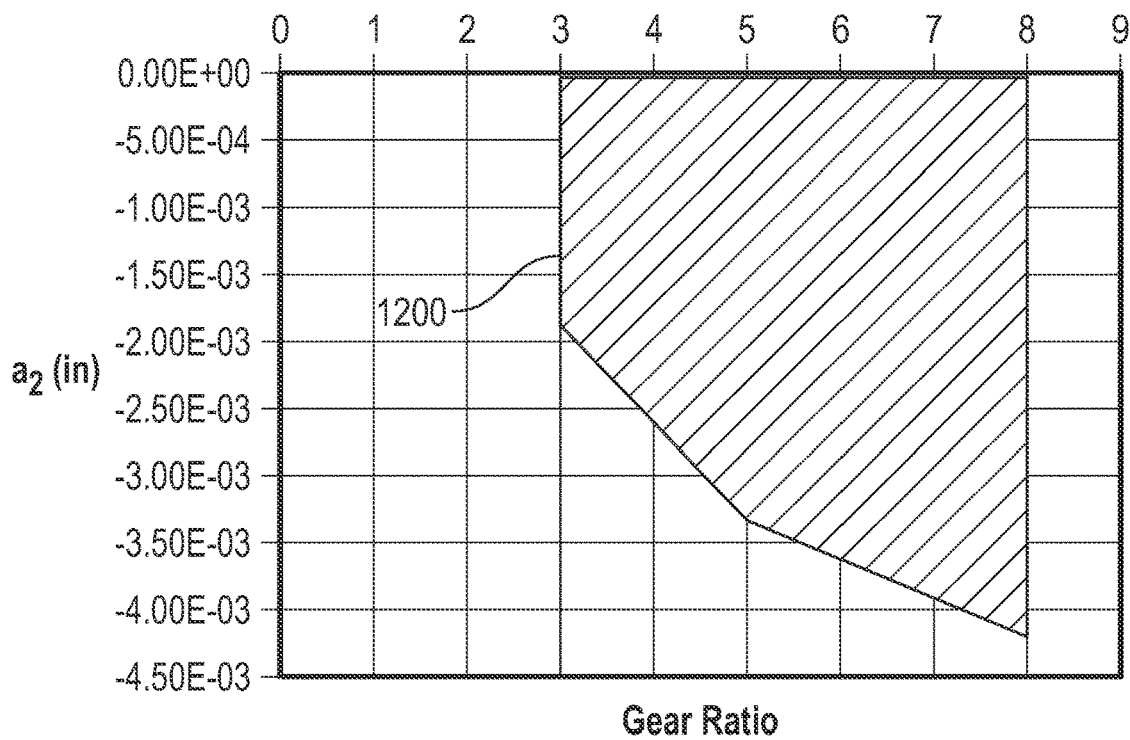
FIG. 12 is a graph illustrating a contoured portion deflection as a function of a gear ratio of a gearbox assembly, according to embodiments of the present disclosure.

FIG. 12 represents, in graph form, the contoured portion deflection $a_2$ as a function of the gear ratio. Tables 1 and 4 and FIG. 12 show that the contoured portion deflection $a_2$ may be changed based on the gear ratio of the gearbox assembly 246. An area 1200 may represent the boundaries of the contoured portion deflection $a_2$ as a function of the gear ratio in which a particular planet pin 490 is designed. As shown in FIG. 12, the contoured portion deflection $a_2$ is greater than or equal to −4.2e-03 inches and less than or equal to −1.2e-05 inches when the gear ratio is between three and eight, respectively. Thus, as the gear ratio increases, the contoured portion deflection $a_2$ decreases. For example, the higher the gear ratio, the greater the deflection of the contoured portion radius 473 needs to be from the planet pin radius $r_p$ due to a greater deformation of the planet gear rim 391 as a result of the higher gear ratio (e.g., the torque on the planet gear 384 is increased as the gear ratio increases).

Figure 13:
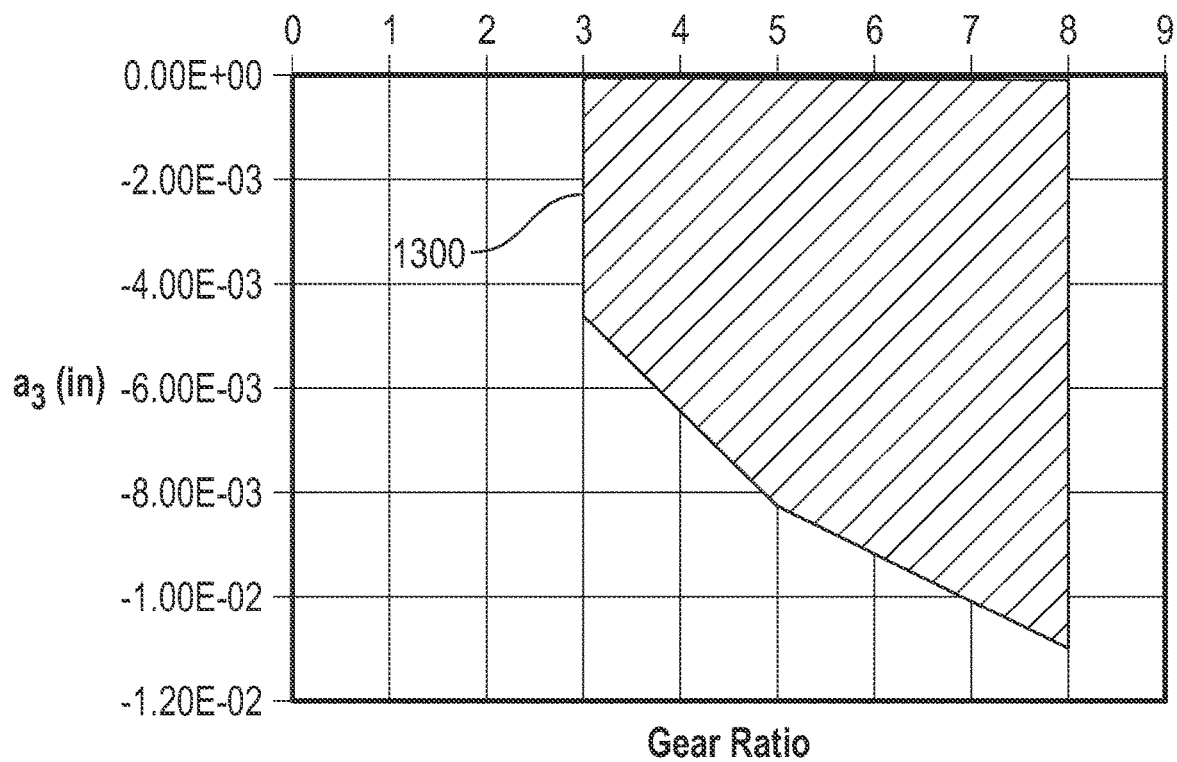
FIG. 13 is a graph illustrating a major axis deflection as a function of a gear ratio of a gearbox assembly, according to embodiments of the present disclosure.

FIG. 13 represents, in graph form, the major axis deflection $a_3$ as a function of the gear ratio. Tables 1 and 4 and FIG. 13 show that the major axis deflection $a_3$ may be changed based on the gear ratio of the gearbox assembly 246. An area 1300 may represent the boundaries of the major axis deflection $a_3$ as a function of the gear ratio in which a particular planet pin 490 is designed. As shown in FIG. 13, the major axis deflection $a_3$ is greater than or equal to −1.1e-02 inches and less than or equal to −1.2e-05 inches when the gear ratio is between three and eight, respectively. Thus, as the gear ratio increases, the major axis deflection $a_3$ decreases. For example, the higher the gear ratio, the greater the deflection of the major axis radius 475 needs to be from the planet pin radius $r_p$ due to a greater deformation of the planet gear rim 391 as a result of the higher gear ratio (e.g., the torque on the planet gear 384 is increased as the gear ratio increases).

Table 5 shows exemplary embodiments 18 to 20 identifying minimum and maximum values of the minor axis deflection $a_1$, the contoured portion deflection $a_2$, and the major axis deflection $a_3$ for various turbine engines at various planet pin radii $r_p$ when the other variables remain the same. Embodiments 18 to 20 may represent the turbine engine 10 described with respect to FIG. 1 and can be applied to the gearbox assembly 246 described in FIG. 2. In Table 5, the minor axis deflection $a_1$ is determined based on the relationship (1), the contoured portion deflection $a_2$ is determined based on the relationship (2), and the major axis deflection $a_3$ is determined based on the relationship (3), described above.

Figure 15:
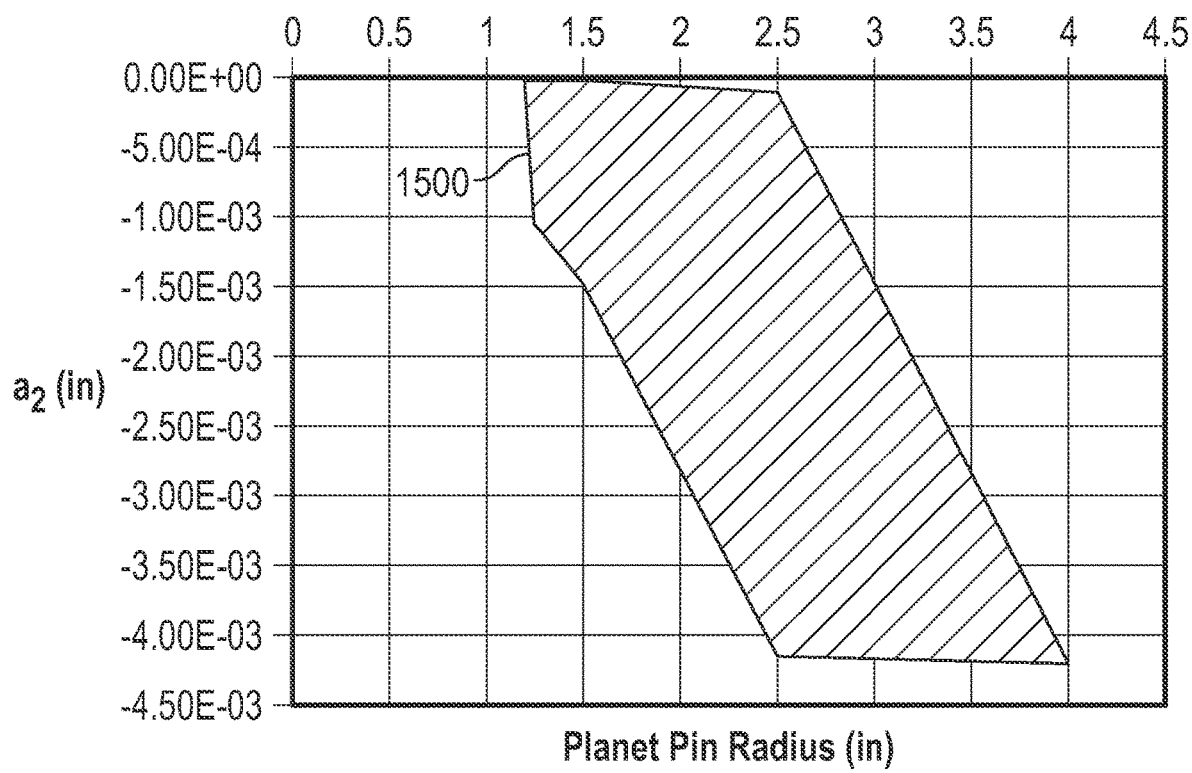
FIG. 15 is a graph illustrating a contoured portion deflection as a function of a planet pin radius of a planet pin, according to embodiments of the present disclosure.

1 and 5 and FIG. 15 show that the contoured portion deflection $a_2$ may be changed based on the planet pin radius $r_p$ of a circular planet pin 390 (FIG. 3). An area 1500 may represent the boundaries of the contoured portion deflection $a_2$ as a function of the planet pin radius $r_p$ in which a particular planet pin 490 is designed. As shown in FIG. 15, the contoured portion deflection $a_2$ is greater than or equal to −4.2e-03 inches and less than or equal to −1.2e-05 inches when the planet pin radius $r_p$ is between one point two inches and four inches, respectively. Thus, as the planet pin radius $r_p$ increases, the contoured portion deflection $a_2$ decreases. For example, the higher the planet pin radius $r_p$, the greater the deflection of the contoured portion radius 473 needs to be from the planet pin radius $r_p$.

Figure 16:
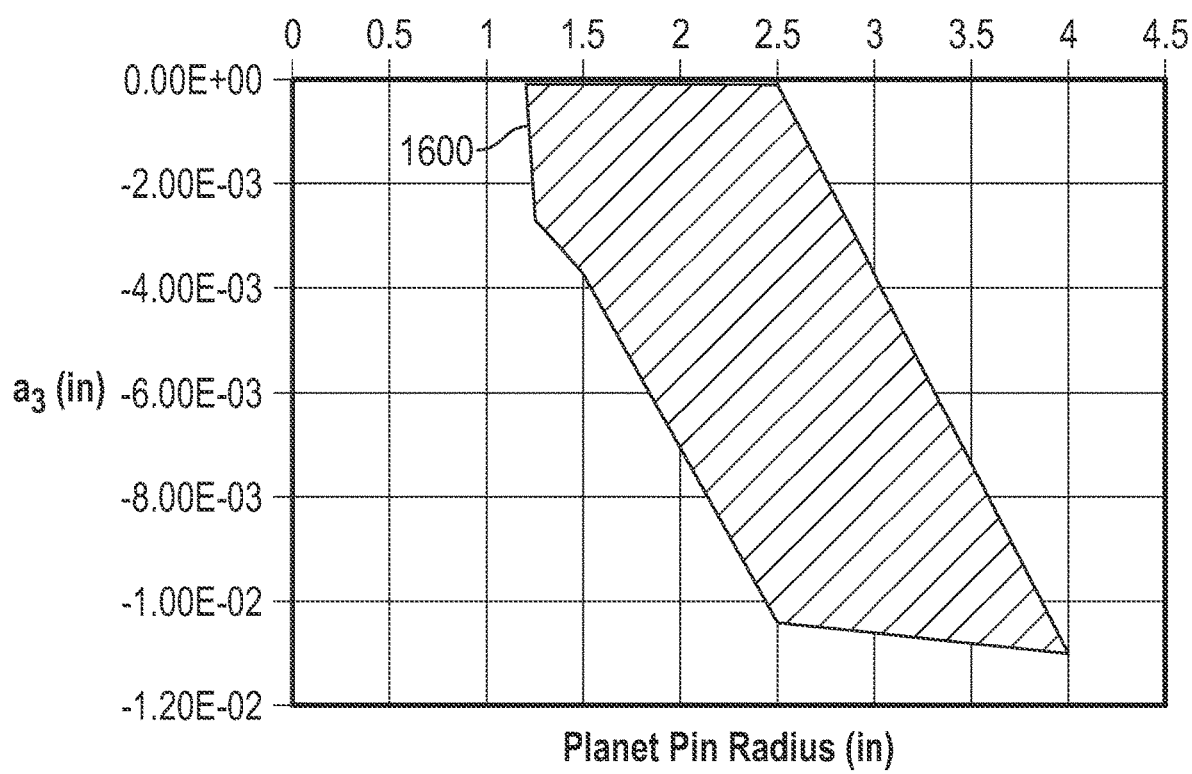
FIG. 16 is a graph illustrating a major axis deflection as a function of a planet pin radius of a planet pin, according to embodiments of the present disclosure.

FIG. 16 represents, in graph form, the major axis deflection $a_3$ as a function of the planet pin radius $r_p$. Tables 1 and 5 and FIG. 16 show that the major axis deflection $a_3$ may be changed based on the planet pin radius $r_p$ of a circular planet pin 390 (FIG. 3). An area 1600 may represent the boundaries of the major axis deflection $a_3$ as a function of the planet pin radius $r_p$ in which a particular planet pin 490 is designed. As shown in FIG. 16, the major axis deflection $a_3$ is greater than or equal to −1.1e-02 inches and less than or equal to −1.2e-05 inches when the planet pin radius $r_p$ is between one point two inches and four inches, respectively. Thus, as the planet pin radius $r_p$ increases, the major axis deflection $a_3$ decreases. For example, the higher the planet pin radius $r_p$, the greater the deflection of the major axis radius 475 needs to be from the planet pin radius $r_p$.

Table 6 shows exemplary embodiments 20 to 22 identifying minimum and maximum values of the minor axis

TABLE 5

| Emb. | $r_p$ (in) | Min. $a_1$ (in) | Max. $a_1$ (in) | Min. $a_2$ (in) | Max. $a_2$ (in) | Min. $a_3$ (in) | Max. $a_3$ (in) |
|---|---|---|---|---|---|---|---|
| 18 | 1.25 | −1.28e−03 | −1.30e−05 | −1.04e−03 | −1.27e−05 | −2.59e−03 | −1.28e−05 |
| 19 | 1.5 | −1.84e−03 | −2.30e−05 | −1.49e−03 | −2.40e−05 | −3.73e−03 | −1.84e−05 |
| 20 | 2.5 | −5.11e−03 | −1.09e−04 | −4.16e−03 | −9.99e−05 | −1.04e−02 | −5.12e−05 |

Figure 14:
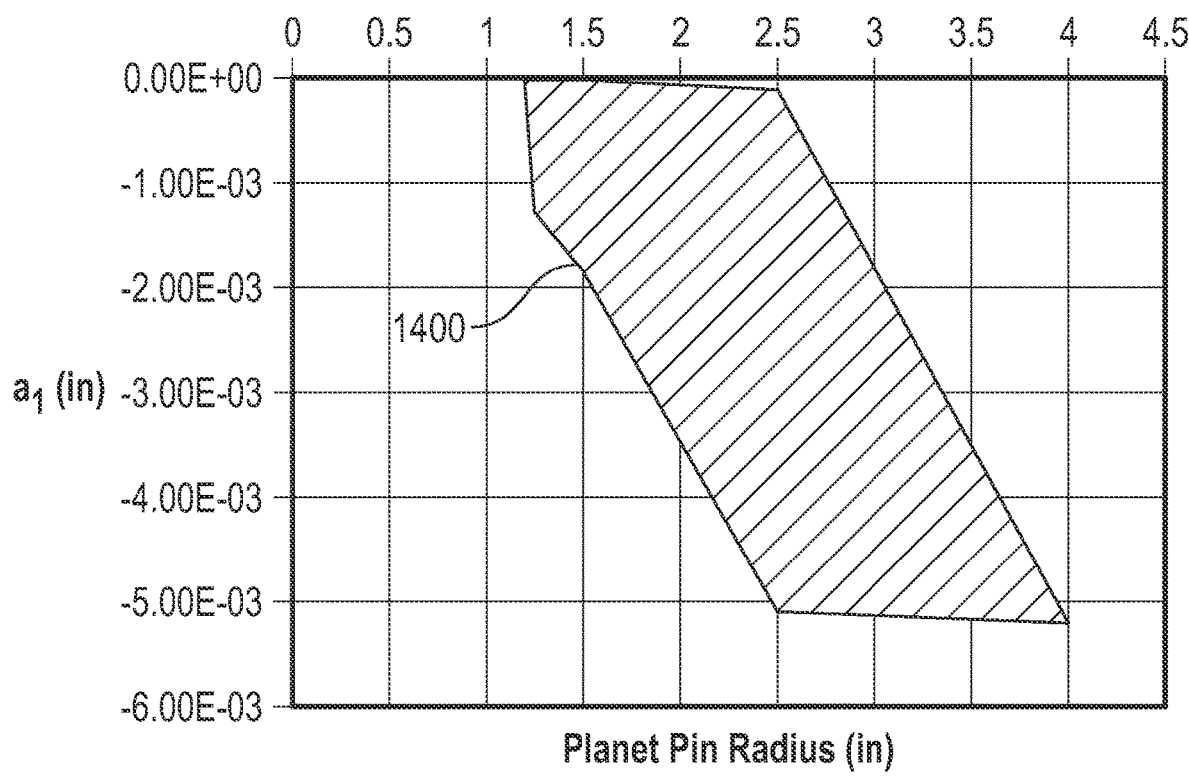
FIG. 14 is a graph illustrating a minor axis deflection as a function of a planet pin radius of a planet pin, according to embodiments of the present disclosure.

FIG. 14 represents, in graph form, the minor axis deflection $a_1$ as a function of the planet pin radius $r_p$. Tables 1 and 5 and FIG. 14 show that the minor axis deflection $a_1$ may be changed based on the planet pin radius $r_p$ of a circular planet pin 390 (FIG. 3). An area 1400 may represent the boundaries of the minor axis deflection $a_1$ as a function of the planet pin radius $r_p$ in which a particular planet pin 490 is designed. As shown in FIG. 14, the minor axis deflection $a_1$ is greater than or equal to −5.2e-03 inches and less than or equal to −1.3e-05 inches when the planet pin radius $r_p$ is between one point two inches and four inches, respectively. Thus, as the planet pin radius $r_p$ increases, the minor axis deflection $a_1$ decreases. For example, the greater the planet pin radius $r_p$, the greater the deflection of the minor axis radius 471 needs to be from the planet pin radius $r_p$.

FIG. 15 represents, in graph form, the contoured portion deflection $a_2$ as a function of the planet pin radius $r_p$. Tables deflection $a_1$, the contoured portion deflection $a_2$, and the major axis deflection $a_3$ for various turbine engines with various numbers of planet gears 284 $N_p$ when the other variables remain the same. Embodiments 20 to 22 may represent the turbine engine 10 described with respect to FIG. 1 and can be applied to the gearbox assembly 246 described in FIG. 2. In Table 6, the minor axis deflection $a_1$ is determined based on the relationship (1), the contoured portion deflection $a_2$ is determined based on the relationship (2), and the major axis deflection $a_3$ is determined based on the relationship (3), described above.

TABLE 6

| Emb. | $N_p$ | Min. $a_1$ (in) | Max. $a_1$ (in) | Min. $a_2$ (in) | Max. $a_2$ (in) | Min. $a_3$ (in) | Max. $a_3$ (in) |
|---|---|---|---|---|---|---|---|
| 20 | 3 | −5.11e−03 | −2.07e−05 | −4.16e−03 | −1.98e−05 | −1.04e−02 | −2.56e−05 |
| 21 | 5 | −3.07e−03 | −1.47e−05 | −2.50e−03 | −1.41e−05 | −6.22e−03 | −1.54e−05 |
| 22 | 6 | −2.56e−03 | −1.30e−05 | −2.09e−03 | −1.27e−05 | −5.19e−03 | −1.28e−05 |

Figure 17:
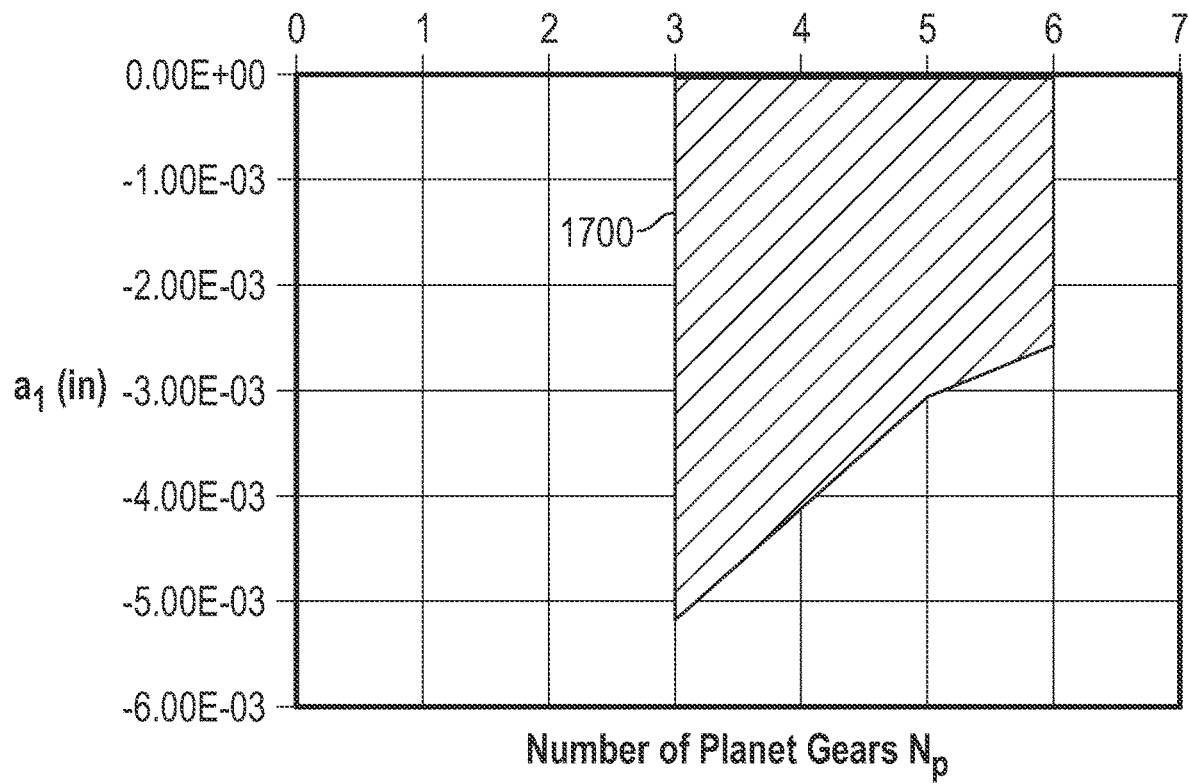
FIG. 17 is a graph illustrating a minor axis deflection as a function of a number of planet gears of a gearbox assembly, according to embodiments of the present disclosure.

FIG. 17 represents, in graph form, the minor axis deflection $a_1$ as a function of the number of planet gears 284 in the gearbox assembly 246 (FIG. 2). Tables 1 and 6 and FIG. 17 show that the minor axis deflection $a_1$ may be changed based on the number of planet gears 284 in the gearbox assembly 246. An area 1700 may represent the boundaries of the minor axis deflection $a_1$ as a function of the number of planet gears 284 in the gearbox assembly 246 in which a particular planet pin 490 is designed. As shown in FIG. 17, the minor axis deflection $a_1$ is greater than or equal to −5.2e-03 inches and less than or equal to −1.3e-05 inches when the number of planet gears 284 is between three and six, respectively. Thus, as the number of planet gears 284 increases, the minor axis deflection $a_1$ increases. For example, the greater the number of planet gears 284 in the gearbox assembly 246, the lesser the deflection of the minor axis radius 471 needs to be from the planet pin radius $r_p$.

Figure 18:
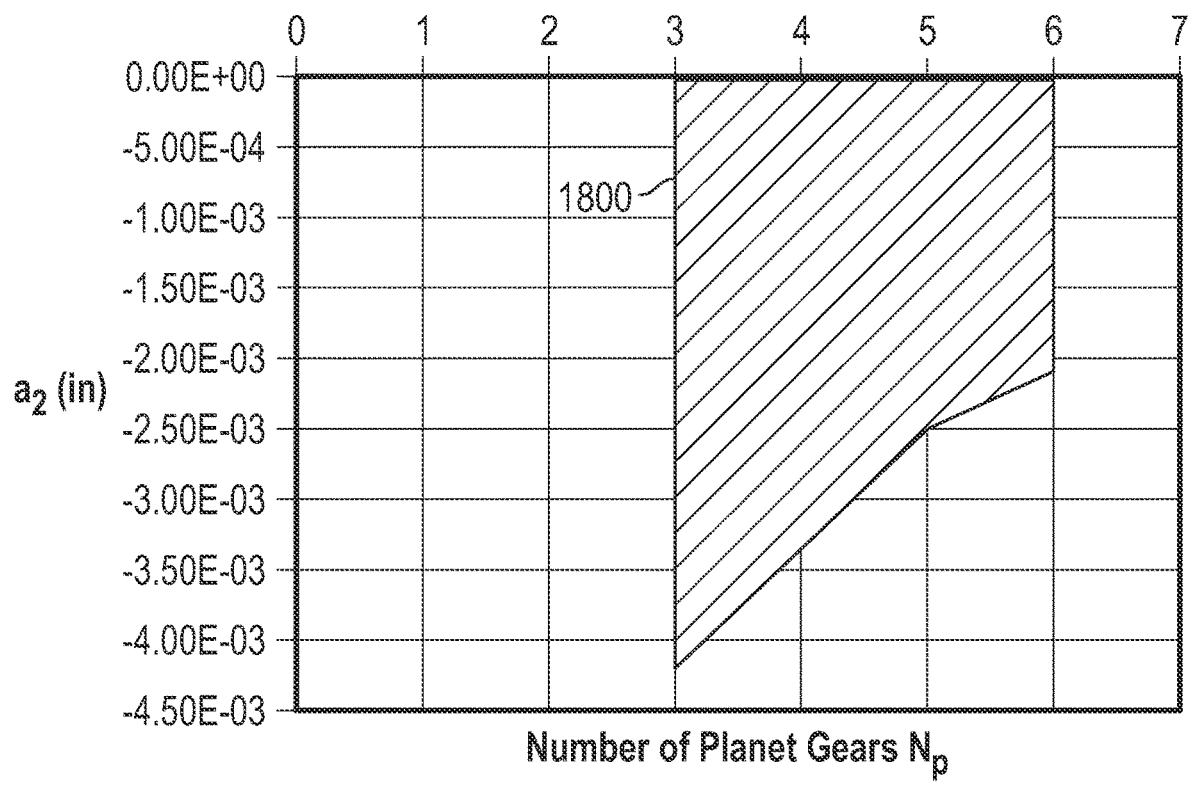
FIG. 18 is a graph illustrating a contoured portion deflection as a function of a number of planet gears of a gearbox assembly, according to embodiments of the present disclosure.

FIG. 18 represents, in graph form, the contoured portion deflection $a_2$ as a function of the number of planet gears 284 in the gearbox assembly 246 (FIG. 2). Tables 1 and 6 and FIG. 18 show that the contoured portion deflection $a_2$ may be changed based on the number of planet gears 284 in the gearbox assembly 246. An area 1800 may represent the boundaries of the contoured portion deflection $a_2$ as a function of the number of planet gears 284 in the gearbox assembly 246 in which a particular planet pin 490 is designed. As shown in FIG. 18, the contoured portion deflection $a_2$ is greater than or equal to −4.2e-03 inches and less than or equal to −1.2e-05 inches when the number of planet gears 284 in the gearbox assembly 246 is between three and six, respectively. Thus, as the number of planet gears 284 in the gearbox assembly 246 increases, the contoured portion deflection $a_2$ increases. For example, the greater the number of planet gears 284 in the gearbox assembly 246, the lesser the deflection of the contoured portion radius 473 needs to be from the planet pin radius $r_p$.

Figure 19:
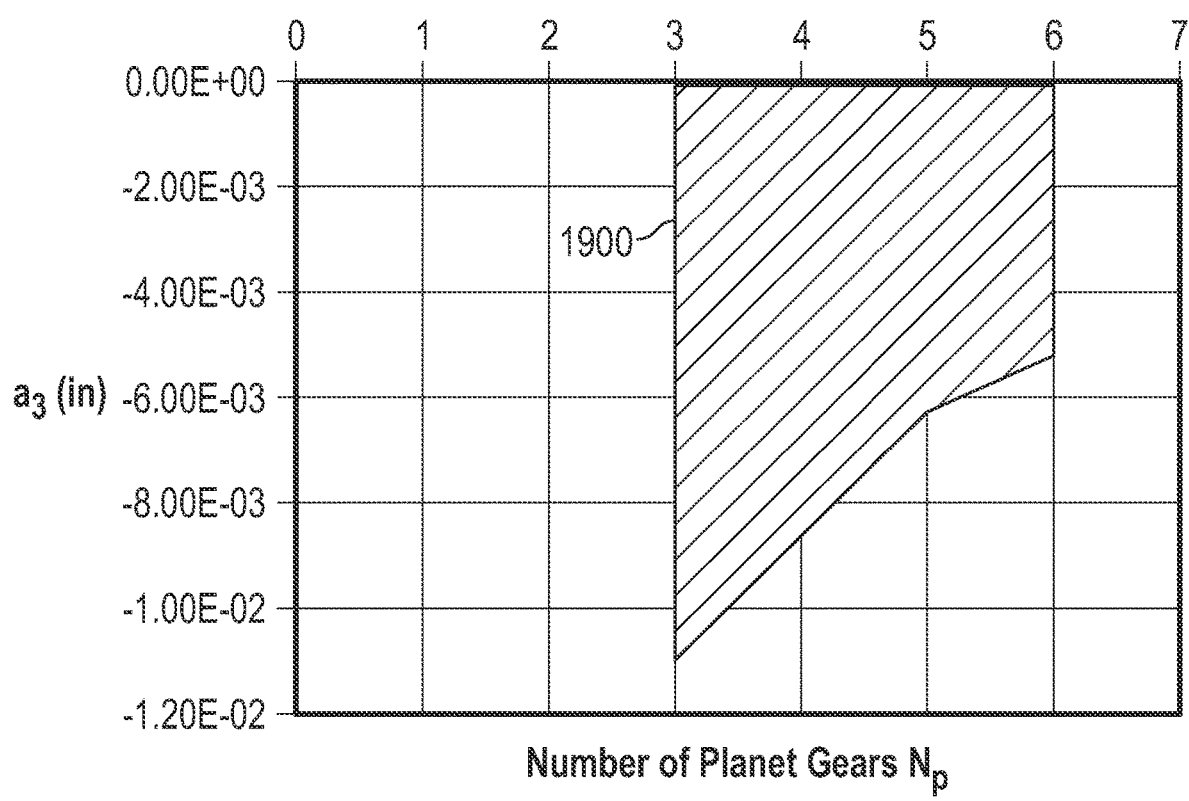
FIG. 19 is a graph illustrating a major axis deflection as a function of a number of planet gears of a gearbox assembly, according to embodiments of the present disclosure.

FIG. 19 represents, in graph form, the major axis deflection $a_3$ as a function of the number of planet gears 284 in the gearbox assembly 246 (FIG. 2). Tables 1 and 6 and FIG. 19 show that the major axis deflection $a_3$ may be changed based on the number of planet gears 284 in the gearbox assembly 246. An area 1900 may represent the boundaries of the major axis deflection $a_3$ as a function of the number of planet gears 284 in the gearbox assembly 246 in which a particular planet pin 490 is designed. As shown in FIG. 19, the major axis deflection $a_3$ is greater than or equal to −1.1e-02 inches and less than or equal to −1.2e-05 inches when the number of planet gears 284 in the gearbox assembly 246 is between three and six, respectively. Thus, as the number of planet gears 284 in the gearbox assembly 246 increases, the major axis deflection $a_3$ increases. For example, the greater the number of planet gears 284 in the gearbox assembly 246, the lesser the deflection of the major axis radius 475 needs to be from the planet pin radius $r_p$.

The embodiments of the present disclosure provide for a circumferential contouring of the planet pin 490. The designed contouring of the planet pin 490 reflects the deformation of the planet gear rim 391 due to the forces exerted on the planet gear 384 during operation of the gearbox assembly 246. Thus, the clearance between the planet pin 490 and the planet gear rim 391 is increased, thus, improving performance of the journal bearing of the planet pin 490 and the planet gear 384 and improving efficiency of the gearbox assembly 246 as compared to gearbox assemblies without the benefit of the present disclosure.

Further aspects are provided by the subject matter of the following clauses.

A gearbox assembly for a turbine engine includes a core turbine engine having a drive shaft and a fan having a fan shaft. The gearbox assembly comprises a first gear, a second gear, and a planet pin. The first gear is coupled to the drive shaft. The second gear is supported by a planet carrier. The planet carrier is coupled to the fan shaft. Torque is transferred from the drive shaft to the fan shaft through the gearbox assembly. The planet pin is disposed within the second gear. A planet pin shape of the planet pin includes a contoured portion that is characterized by a contoured portion deflection that is greater than or equal to −4.2e-03 inches and less than or equal to −1.2e-05 inches.

The gearbox assembly of the preceding clause, the contoured portion deflection equaling $$1.07 * 10^{-9} r_p^2 \left[ -8.9987 * 10^{-5} r_p^3 \frac{GR}{GR-2} \Omega_{fan}^2 - 27547.05 \frac{1}{N_p} \left( \frac{HP_{fan}}{\Omega_{fan}} \right) \frac{GR-2}{GR} \right],$$

$r_p$ being a radius of a circular shape of the planet pin, GR being a gear ratio of the gearbox assembly, $\Omega_{fan}$ being fan speed of the fan, $N_p$ being a number of second gears in the gearbox assembly, and $HP_{fan}$ being a fan power of the fan.

The gearbox assembly of any preceding clause, the planet pin shape of the planet pin including a minor axis being characterized by a minor axis deflection and a major axis being characterized by a major axis deflection. The minor axis deflection is greater than or equal to −5.2-03 inches and less than or equal to −1.3e-05 inches. The major axis deflection is greater than or equal to −1.1e-02 inches and less than or equal to −1.2e-05 inches.

The gearbox assembly of any preceding clause, the planet pin shape of the planet pin including a minor axis radius, a contoured portion radius, and a major axis radius.

The gearbox assembly of any preceding clause, the minor axis radius being a radius of a circular shape of the planet pin plus the minor axis deflection. The contoured portion radius is the radius of the circular shape of the planet pin plus the contoured portion deflection, and the major axis radius is the radius of the circular shape of the planet pin plus the major axis deflection.

The gearbox assembly of any preceding clause, the minor axis deflection equaling $$1.07 * 10^{-9} r_p^2 \left[ -6.764 * 10^{-5} r_p^3 \frac{GR}{GR-2} \Omega_{fan}^2 - 33914.7 \frac{1}{N_p} \left( \frac{HP_{fan}}{\Omega_{fan}} \right) \frac{GR-2}{GR} \right]$$

and the major axis deflection equaling $$1.07 * 10^{-9} r_p^2 \left[ -68934.52 \frac{1}{N_p} \left( \frac{HP_{fan}}{\Omega_{fan}} \right) \frac{GR-2}{GR} \right].$$

The gearbox assembly of any preceding clause, $HP_{fan}$ being between seven thousand horsepower and ninety thousand horsepower.

The gearbox assembly of any preceding clause, $HP_{fan}$ being between seven thousand horsepower and thirty-four thousand horsepower.

The gearbox assembly of any preceding clause, $\Omega_{fan}$ being between one thousand rpm and three thousand five hundred rpm.

The gearbox assembly of any preceding clause, GR being between three and eight.

The gearbox assembly of any preceding clause, GR being between three and five.

The gearbox assembly of any preceding clause, $r_p$ being between one point two inches and four inches.

The gearbox assembly of any preceding clause, $r_p$ being between one point four inches and two point five inches.

The gearbox assembly of any preceding clause, $N_p$ being between three and six.

A turbine engine includes a fan including a fan shaft, a core turbine engine including a drive shaft, and a gearbox assembly. The gearbox assembly includes a first gear, a second gear, and a planet pin. The first gear is coupled to the drive shaft. The second gear is supported by a planet carrier. The planet carrier is coupled to the fan shaft. Torque is transferred from the drive shaft to the fan shaft through the gearbox assembly. The planet pin is disposed within the second gear. A planet pin shape of the planet pin includes a contoured portion that is characterized by a contoured portion deflection that is greater than or equal to −4.2e-03 inches and less than or equal to −1.2e-05 inches.

The turbine engine of any preceding clause, the contoured portion deflection equaling $$1.07 * 10^{-9} r_p^2 \left[ -8.9987 * 10^{-5} r_p^3 \frac{GR}{GR-2} \Omega_{fan}^2 - 27547.05 \frac{1}{N_p} \left( \frac{HP_{fan}}{\Omega_{fan}} \right) \frac{GR-2}{GR} \right] \cdot r_p$$

is a radius of a circular shape of the planet pin, GR is a gear ratio of the gearbox assembly, $\Omega_{fan}$ is fan speed of the fan, $N_p$ is a number of second gears in the gearbox assembly, and $HP_{fan}$ is a fan power of the fan.

The turbine engine of any preceding clause, the planet pin shape of the planet pin including a minor axis being characterized by a minor axis deflection and major axis being characterized by a major axis deflection. The minor axis deflection is greater than or equal to −5.2e-03 inches and less than or equal to −1.3e-05 inches. The major axis deflection is greater than or equal to −1.1e-02 inches and less than or equal to −1.2e-05 inches.

The turbine engine of any preceding clause, the planet pin shape of the planet pin including a minor axis radius, a contoured portion radius, and a major axis radius.

The turbine engine of any preceding clause, the minor axis radius being a radius of a circular shape of the planet pin plus the minor axis deflection. The contoured portion radius is the radius of the circular shape of the planet pin plus the contoured portion deflection, and the major axis radius is the radius of the circular shape of the planet pin plus the major axis deflection.

The turbine engine of any preceding clause, the minor axis deflection equaling $$1.07 * 10^{-9} r_p^2 \left[ -6.764 * 10^{-5} r_p^3 \frac{GR}{GR-2} \Omega_{fan}^2 - 33914.7 \frac{1}{N_p} \left( \frac{HP_{fan}}{\Omega_{fan}} \right) \frac{GR-2}{GR} \right]$$

and the major axis deflection equaling $$1.07 * 10^{-9} r_p^2 \left[ -68934.52 \frac{1}{N_p} \left( \frac{HP_{fan}}{\Omega_{fan}} \right) \frac{GR-2}{GR} \right].$$

The turbine engine of any preceding clause, $HP_{fan}$ being between seven thousand horsepower and ninety thousand horsepower.

The turbine engine of any preceding clause, $HP_{fan}$ being between seven thousand horsepower and thirty-four thousand horsepower.

The turbine engine of any preceding clause, $\Omega_{fan}$ being between one thousand rpm and three thousand five hundred rpm.

The turbine engine of any preceding clause, GR being between three and eight.

The turbine engine of any preceding clause, GR being between three and five.

The turbine engine of any preceding clause, $r_p$ being between one point two inches and four inches.

The turbine engine of any preceding clause, $r_p$ being between one point four inches and two point five inches.

The turbine engine of any preceding clause, $N_p$ being between three and six.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A gearbox assembly for a turbine engine including a core turbine engine having a drive shaft and a fan having a fan shaft, the gearbox assembly comprising:
   a first gear coupled to the drive shaft;
   a second gear supported by a planet carrier, the planet carrier being coupled to the fan shaft, wherein torque is transferred from the drive shaft to the fan shaft through the gearbox assembly; and
   a planet pin disposed within the second gear, wherein a planet pin shape of the planet pin includes a contoured portion that is characterized by a contoured portion deflection that is greater than or equal to −4.2e-03 inches and less than or equal to −1.2e-05 inches.

2. The gearbox assembly of claim 1, wherein the contoured portion deflection equals $$1.07 * 10^{-9} r_p^2 \left[ -8.9987 * 10^{-5} r_p^3 \frac{GR}{GR-2} \Omega_{fan}^2 - 27547.05 \frac{1}{N_p} \left( \frac{HP_{fan}}{\Omega_{fan}} \right) \frac{GR-2}{GR} \right]$$

wherein $r_p$ is a radius of a circular shape of the planet pin, GR is a gear ratio of the gearbox assembly, $\Omega_{fan}$ is fan speed of the fan, $N_p$ is a number of second gears in the gearbox assembly, and $HP_{fan}$ is a fan power of the fan.

3. The gearbox assembly of claim 2, wherein the planet pin shape of the planet pin includes a minor axis that is characterized by a minor axis deflection and a major axis that is characterized by a major axis deflection,
   wherein the minor axis deflection is greater than or equal to −5.2-03 inches and less than or equal to −1.3e-05 inches, and
   wherein the major axis deflection is greater than or equal to −1.1e-02 inches and less than or equal to −1.2e-05 inches.

4. The gearbox assembly of claim 3, wherein the planet pin shape of the planet pin includes a minor axis radius, a contoured portion radius, and a major axis radius.

5. The gearbox assembly of claim 4, wherein the minor axis radius is a radius of a circular shape of the planet pin plus the minor axis deflection, the contoured portion radius is the radius of the circular shape of the planet pin plus the contoured portion deflection, and the major axis radius is the radius of the circular shape of the planet pin plus the major axis deflection.

6. The gearbox assembly of claim 3, wherein the minor axis deflection equals $$1.07*10^{-9}r_p^2\left[-6.764*10^{-5}r_p^3\frac{GR}{GR-2}\Omega_{fan}^2-33914.7\frac{1}{N_p}\left(\frac{HP_{fan}}{\Omega_{fan}}\right)\frac{GR-2}{GR}\right]$$

and the major axis deflection equals $$1.07*10^{-9}r_p^2\left[-68934.52\frac{1}{N_p}\left(\frac{HP_{fan}}{\Omega_{fan}}\right)\frac{GR-2}{GR}\right].$$

7. The gearbox assembly of claim 6, wherein $HP_{fan}$ is between seven thousand horsepower and ninety thousand horsepower.

8. The gearbox assembly of claim 6, wherein $HP_{fan}$ is between seven thousand horsepower and thirty-four thousand horsepower.

9. The gearbox assembly of claim 6, wherein $\Omega_{fan}$ is between one thousand rpm and three thousand five hundred rpm.

10. The gearbox assembly of claim 6, wherein GR is between three and eight.

11. The gearbox assembly of claim 6, wherein GR is between three and five.

12. The gearbox assembly of claim 6, wherein $r_p$ is between one point two inches and four inches.

13. The gearbox assembly of claim 6, wherein $r_p$ is between one point four inches and two point five inches.

14. The gearbox assembly of claim 6, wherein $N_p$ is between three and six.

15. A turbine engine comprising:
a fan including a fan shaft;
a core turbine engine including a drive shaft; and
a gearbox assembly comprising:
a first gear coupled to the drive shaft;
a second gear supported by a planet carrier, the planet carrier being coupled to the fan shaft, wherein torque is transferred from the drive shaft to the fan shaft through the gearbox assembly; and
a planet pin disposed within the second gear, wherein a planet pin shape of the planet pin includes a contoured portion that is characterized by a contoured portion deflection that is greater than or equal to −4.2e-03 inches and less than or equal to −1.2e-05 inches.

16. The turbine engine of claim 15, wherein the contoured portion deflection equals $$1.07*10^{-9}r_p^2\left[-8.9987*10^{-5}r_p^3\frac{GR}{GR-2}\Omega_{fan}^2-27547.05\frac{1}{N_p}\left(\frac{HP_{fan}}{\Omega_{fan}}\right)\frac{GR-2}{GR}\right]$$

wherein $r_p$ is a radius of a circular shape of the planet pin, GR is a gear ratio of the gearbox assembly, $\Omega_{fan}$ is fan speed of the fan, $N_p$ is a number of second gears in the gearbox assembly, and $HP_{fan}$ is a fan power of the fan.

17. The turbine engine of claim 16, wherein the planet pin shape of the planet pin includes a minor axis that is characterized by a minor axis deflection and a major axis that is characterized by a major axis deflection,
wherein the minor axis deflection is greater than or equal to −5.2e-03 inches and less than or equal to −1.3e-05 inches, and
wherein the major axis deflection is greater than or equal to −1.1e-02 inches and less than or equal to −1.2e-05 inches.

18. The turbine engine of claim 17, wherein the planet pin shape of the planet pin includes a minor axis radius, a contoured portion radius, and a major axis radius.

19. The turbine engine of claim 18, wherein the minor axis radius is a radius of a circular shape of the planet pin plus the minor axis deflection, the contoured portion radius is the radius of the circular shape of the planet pin plus the contoured portion deflection, and the major axis radius is the radius of the circular shape of the planet pin plus the major axis deflection.

20. The turbine engine of claim 17, wherein the minor axis deflection equals $$1.07*10^{-9}r_p^2\left[-6.764*10^{-5}r_p^3\frac{GR}{GR-2}\Omega_{fan}^2-33914.7\frac{1}{N_p}\left(\frac{HP_{fan}}{\Omega_{fan}}\right)\frac{GR-2}{GR}\right]$$

and the major axis deflection equals $$1.07*10^{-9}r_p^2\left[-68934.52\frac{1}{N_p}\left(\frac{HP_{fan}}{\Omega_{fan}}\right)\frac{GR-2}{GR}\right].$$

* * * * *